(12) United States Patent
Wang et al.

(10) Patent No.: US 12,200,650 B2
(45) Date of Patent: Jan. 14, 2025

(54) SATELLITE TRACKING AREA UPDATE METHOD AND RELATED APPARATUS

(71) Applicant: Huawei Technologies Co., Ltd., Shenzhen (CN)

(72) Inventors: Yu Wang, Hangzhou (CN); Rong Li, Hangzhou (CN); Xian Meng, Hangzhou (CN); Bin Wang, Hangzhou (CN); Rongdao Yu, Shenzhen (CN); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 663 days.

(21) Appl. No.: 17/487,948

(22) Filed: Sep. 28, 2021

(65) Prior Publication Data

US 2022/0022155 A1 Jan. 20, 2022

Related U.S. Application Data

(63) Continuation of application No. PCT/CN2020/081141, filed on Mar. 25, 2020.

(30) Foreign Application Priority Data

Mar. 29, 2019 (CN) .......................... 201910259340.9

(51) Int. Cl.
*H04W 60/04* (2009.01)
*G01S 5/02* (2010.01)
*H04W 84/06* (2009.01)

(52) U.S. Cl.
CPC ........... *H04W 60/04* (2013.01); *G01S 5/0284* (2013.01); *H04W 84/06* (2013.01)

(58) Field of Classification Search
CPC ..... H04W 60/04; H04W 84/04; H04W 84/06; H04W 64/00; G01S 5/0284; G01S 5/0289
See application file for complete search history.

(56) References Cited

U.S. PATENT DOCUMENTS 9,801,014 B2 10/2017 Acharya et al.
10,645,533 B1 * 5/2020 Winter .................. H04W 24/02
(Continued)

FOREIGN PATENT DOCUMENTS

CN 101998579 A 3/2011
CN 102523569 A 6/2012
(Continued)

OTHER PUBLICATIONS

Ericsson, "Tracking area management and update for NTN LEO", 3GPP TSG-RAN WG2 #105, Tdoc R2-1900544, Athens, Greece, Feb. 25-Mar. 1, 2019, 7 pages.
(Continued)

*Primary Examiner* — Kevin D Mew
(74) *Attorney, Agent, or Firm* — Slater Matsil, LLP

(57) ABSTRACT

User equipment receives at least one TAC that is broadcast by a network device, where the TAC includes geographical location information, and the geographical location information is used to indicate a geographical location of a preset location point in a TA corresponding to the TAC. The user equipment determines, based on the TAC and a tracking area list (TAL), whether the TAL needs to be updated. If it is determined that the TAL needs to be updated, the user equipment sends a tracking area update request to the network device. The user equipment receives a response message, of the tracking area update request, returned by the network device.

20 Claims, 13 Drawing Sheets

(56) References Cited

U.S. PATENT DOCUMENTS

| | | | |
|---|---|---|---|
| 2012/0106468 A1* | 5/2012 | Engstrom | H04L 61/30 370/329 |
| 2013/0331095 A1* | 12/2013 | Brombal | H04W 4/16 455/432.1 |
| 2014/0044058 A1 | 2/2014 | El-saidny et al. | |
| 2014/0092871 A1* | 4/2014 | Wang | H04W 60/04 370/331 |
| 2014/0221002 A1* | 8/2014 | Kahn | H04W 12/08 455/456.1 |
| 2015/0029955 A1* | 1/2015 | Heo | H01Q 1/243 370/329 |
| 2017/0142686 A1 | 5/2017 | Zhang | |
| 2017/0347272 A1* | 11/2017 | Ahmavaara | H04W 48/12 |
| 2018/0017406 A1* | 1/2018 | Semnani | G01C 21/206 |
| 2018/0098276 A1* | 4/2018 | Livanos | H04W 48/08 |
| 2019/0037382 A1 | 1/2019 | Mochizuki et al. | |
| 2019/0082481 A1* | 3/2019 | Ravishankar | H04W 76/10 |
| 2019/0132728 A1* | 5/2019 | Shekhar | H04W 12/06 |
| 2019/0132740 A1* | 5/2019 | De | H04W 12/122 |
| 2019/0174449 A1* | 6/2019 | Shan | H04W 60/04 |
| 2019/0313285 A1* | 10/2019 | Gottwerth | H04W 28/065 |

FOREIGN PATENT DOCUMENTS

| | | | | |
|---|---|---|---|---|
| CN | 104170418 A | | 11/2014 | |
| CN | 106921982 A | | 7/2017 | |
| CN | 108040367 A | | 5/2018 | |
| EP | 2530981 A1 | * | 12/2012 | ............ H04W 36/34 |
| EP | 2744246 A1 | * | 6/2014 | ............ H04W 60/04 |
| RU | 2488239 C2 | | 7/2013 | |
| WO | WO-2013085242 A1 | * | 6/2013 | ............ H04W 60/04 |
| WO | WO-2015067308 A1 | * | 5/2015 | ............ H04W 60/04 |
| WO | 2016019528 A1 | | 2/2016 | |
| WO | WO-2017129287 A1 | * | 8/2017 | ............ H04W 12/10 |
| WO | 2018084644 A1 | | 5/2018 | |
| WO | WO-2020091647 A1 | * | 5/2020 | ........ H04B 7/18513 |
| WO | WO-2022076548 A1 | * | 4/2022 | ........ H04B 7/18565 |

OTHER PUBLICATIONS

Hughes, "NR-NTN: Paging in NGSO Satellite Systems", 3GPP TSG RAN WG3 Meeting #101, R3-184403, Gothenburg, Sweden, Aug. 20-24, 2018, 6 pages.

* cited by examiner

SATELLITE TRACKING AREA UPDATE METHOD AND RELATED APPARATUS

CROSS-REFERENCE TO RELATED APPLICATIONS

This application is a continuation of International Patent Application No. PCT/CN2020/081141, filed on Mar. 25, 2020, which claims priority to Chinese Patent Application No. 201910259340.9, filed on Mar. 29, 2019. The disclosures of the aforementioned applications are hereby incorporated by reference in their entireties.

TECHNICAL FIELD

The present invention relates to the satellite communications field, and in particular, to a satellite tracking area update method and a related apparatus.

BACKGROUND

Satellite communications has significant advantages such as global coverage, long-distance transmission, flexible networking, convenient deployment, and no geographical restriction, and has been widely applied to a plurality of fields such as maritime communication, positioning navigation, disaster relief, scientific experiment, video broadcast, and earth observation. In addition, a future terrestrial fifth-generation (5G) mobile network will have a complete industry chain, a huge user base, a flexible and efficient application service mode, and the like. A satellite communications system and 5G are combined to complement each other, thereby jointly constituting a sea-land-air-space integrated communications network with seamless global coverage, to satisfy omnipresent diverse service requirements of users. This is an important communications development direction in the future.

In a satellite communications system, a coverage area of a non-geostationary earth orbit (NGEO) satellite (for example, a low earth orbit (LEO) or medium earth orbit (MEO) satellite) is a geographical area that is on a surface of the earth and that is within a signal range of the satellite. The coverage area is usually divided into "satellite cells" by using a beamforming antenna of the satellite. To be specific, each beam may correspond to one satellite cell, and each satellite cell covers a geographical area of a specific range. Based on different beam directions, satellite cells from a same satellite or from different satellites may partially overlap. If user equipment (UE) is located in a coverage area of a satellite, the satellite may send a signal to the UE and receive a signal from the UE.

Due to motion of a satellite or UE, relative locations of the UE and a satellite cell may dynamically change. Therefore, a network needs to track a UE location in real time, to ensure that called UE can be paged in a timely and efficient manner when a service arrives, and avoid communication blocking. Location management in an existing 5G network is designed mainly based on a concept of a tracking area (TA). A TA is defined as a free movement area in which UE does not need to update a service. A TA is a cell-level configuration, and is fixedly bound to a satellite cell. One TA may include a plurality of satellite cells, but one satellite cell can belong to only one TA. A TA is identified by a tracking area code (TAC). A TAC is usually managed and allocated by a network operator, and defines a unique tracking area code of an operator. One satellite cell always broadcasts a same TAC.

To simplify location management by a network and prevent a ping-pong effect, a core network uses TACs of a plurality of TAs to form a tracking area list (TAL), and allocates the tracking area list to UE. When a TAC received by the UE is in the TAL, tracking area update (TAU) does not need to be performed. If a TAC received by the UE is not in the TAL, TAU needs to be performed.

To resolve a problem of overheads caused by frequent TAU in a satellite scenario in a conventional technology in which a tracking area is fixedly bound to a cell, a solution in which a tracking area is fixedly bound to a geographical location is proposed in the conventional technology. The earth may be divided into uniform small squares based on longitude and latitude locations, and each square corresponds to one specific TA. When different satellite cells cover the TA, the satellite cells broadcast a TAC corresponding to the TA. Therefore, when UE is at a fixed location, a TAC received by the UE is relatively fixed.

However, practice shows that, when UE is at a fixed location, because different TAs may overlap, a broadcast propagation range is comparatively wide, and the like, the UE may still receive TACs of a plurality of other TAs, and may even receive TACs of some TAs at a comparatively far distance. This leads to unnecessary TAU.

SUMMARY

Embodiments of the present invention provide a satellite tracking area update method and a related apparatus, to effectively avoid unnecessary TAU, and save radio resources.

According to a first aspect, an embodiment of the present invention provides a satellite tracking area update method. The method includes: User equipment receives at least one tracking area code (TAC) that is broadcast by a network device, where the TAC includes geographical location information, and the geographical location information is used to indicate a geographical location of a preset location point in a tracking area (TA) corresponding to the TAC; the user equipment determines, based on the TAC and a tracking area list (TAL), whether the TAL needs to be updated; if it is determined that the TAL needs to be updated, the user equipment sends a tracking area update request to the network device; and the user equipment receives a response message, of the tracking area update request, returned by the network device.

In this embodiment of the present invention, the TAC and the TAL are designed, so that the broadcast TAC and each TAC in the TAL implicitly include geographical location range information of corresponding TAs. The UE can obtain, through parsing based on the TAC, location information of the TA corresponding to the TAC. The UE may determine, based on information in the TAC and TAL, whether to perform TAU. This improves TAU reliability, reduces unnecessary TAU, and saves radio resources.

In a specific implementation, the TAC includes not only the geographical location information but also span indication information, and the span indication information is used to indicate a longitude-direction and/or latitude-direction span of the TA corresponding to the TAC.

It can be learned that, in this embodiment of the present invention, the TAC and the TAL are designed, so that the broadcast TAC and each TAC in the TAL implicitly include geographical location range information of corresponding TAs. The span indication information is introduced, so that this embodiment of the present invention can support non-uniform tracking area design, to adapt to features of unbalanced satellite network service load and unequal terrestrial latitude distances. The UE may determine, based on information in the TAC and TAL, whether to perform TAU. This improves TA design flexibility and TAU reliability, reduces unnecessary TAU, and saves radio resources.

Based on the first aspect, in a possible embodiment, the determining, by the user equipment based on the TAC and a TAL, whether the TAL needs to be updated includes: The user equipment queries the TAL, to determine whether the TAC is recorded in the TAL; the user equipment determines, if the TAC is not recorded in the TAL, whether the user equipment has moved into the TA corresponding to the TAC; and if it is determined that the user equipment has moved into the TA corresponding to the TAC, the user equipment determines that the TAL needs to be updated; or if it is determined that the user equipment has not moved into the TA corresponding to the TAC, the user equipment determines that the TAL does not need to be updated.

It can be learned that, when determining, based on the information in the TAC and TAL, whether to perform TAU, the UE performs TAU only when it is determined that the UE has moved into the TA corresponding to the TAC. Otherwise, TAU is not performed. This avoids unnecessary TAU and saves radio resources.

Based on the first aspect, in a specific embodiment, different user equipments may be classified into user equipment with a GNSS function and user equipment with no GNSS function. The user equipment with the GNSS function includes a GNSS apparatus, and the GNSS apparatus is configured to obtain positioning information of the user equipment by using a global navigation satellite system (GNSS).

The GNSS may be, for example, one of the global positioning system (GPS), the BeiDou navigation satellite system (BDS), the global navigation satellite system (GLONASS), and the Galileo satellite navigation system, or a combination of more than one of these systems.

If the TAC is not recorded in the TAL, the user equipment determines, based on the positioning information of the user equipment and the span indication information and geographical location information in the TAC, whether the user equipment has moved into the TA corresponding to the TAC.

The UE determines an actual location of the UE based on the positioning information of the UE, and the UE also determines, based on the received TAC, a geographical range of the TA corresponding to the TAC. Then, the UE may determine whether the actual location of the UE is within the geographical range of the TA. If the actual location of the UE is within the geographical range of the TA, it indicates that the UE has moved into the TA corresponding to the TAC. Otherwise, it indicates that the UE has not moved into the TA corresponding to the TAC.

It can be learned that, if the newly received TAC does not belong to the TAL, the UE with the GNSS function may determine, by analyzing the positioning information of the UE and the TAC, whether the UE has moved into the corresponding TA. The UE performs TAU only when it is determined that the UE has moved into the corresponding TA. Otherwise, TAU is not performed. This avoids unnecessary TAU and saves radio resources.

Based on the first aspect, in a possible embodiment, when the user equipment does not include a GNSS apparatus, if the TAC is not recorded in the TAL, the user equipment determines, based on the span indication information and geographical location information in the TAC and the TAL, whether the TA corresponding to the TAC has an adjacency relationship with a TA corresponding to any TAC recorded in the TAL, where a plurality of different TACs are recorded in the TAL, and each TAC includes respective span indication information and geographical location information.

During specific implementation, the adjacency relationship may indicate that the two TAs are adjacent TAs (geometrically adjacent). It should be noted that, in other embodiments, the adjacency relationship may be alternatively defined as that a center distance between the two TAs is less than a given threshold, or may be another type of adjacency relationship.

If the TA corresponding to the TAC has no adjacency relationship with the TA corresponding to any TAC recorded in the TAL, the user equipment determines that the user equipment has not moved into the TA corresponding to the TAC.

If the TA corresponding to the TAC has the adjacency relationship with the TA corresponding to any TAC recorded in the TAL, the user equipment determines, based on reception frequency of the TAC, whether the user equipment has moved into the TA corresponding to the TAC.

For example, when the TA corresponding to the newly received TAC is an adjacent TA, the UE may determine whether the reception frequency of the TAC is greater than a preset threshold or whether the reception frequency of the TAC meets another preset condition. If the reception frequency of the TAC is greater than the preset threshold or meets another preset condition, it may be considered that the UE has moved into the TA corresponding to the TAC.

It can be learned that the UE with no GNSS function analyzes whether the TA corresponding to the newly received TAC is an adjacent TA, and needs to further determine, if it is determined that the TA is an adjacent TA, whether the reception frequency of the TAC meets a preset condition. The UE determines to perform TAU, only when the condition is met. Otherwise, TAU is not performed. This greatly reduces unnecessary TAU and saves radio resources.

Based on the first aspect, in a specific embodiment, a plurality of TAs may be obtained through division based on an area within a preset geographical range, where each TA includes N grid units, and N is a positive integer greater than or equal to 1. Different TAs may include different quantities of grid units, that is, different TAs may be different in size. Sizes of different TAs may be designed in a targeted or differentiated manner based on geographical condition factors, service factors, or the like within ranges of the TAs.

The grid unit represents a quantized geographical area in a minimum dimension in TA design. For example, during specific implementation, a minimum grid unit may be designed as at least one of a rectangle, a circle, an ellipse, a triangle, a rhombus, or a regular hexagon, or a combination of more than one of these shapes.

The area that is within the preset geographical range and that is divided into the plurality of TAs based on the foregoing method may be, for example, one or more municipal areas, one or more provincial areas, one or more regional areas, one or more national areas, one or more continental areas, or even a global area.

Correspondingly, the span indication information in the TAC is used to indicate a longitude-direction grid unit quantity and/or latitude-direction grid unit quantity of the tracking area TA corresponding to the TAC.

It can be learned that, in this embodiment of the present invention, the TAC, the TA, and the TAL are designed in a coordinated manner, to support non-uniform TA design, and the broadcast TAC and each TAC in the TAL implicitly include geographical location range information of corresponding TAs. This can not only adapt to the features of unbalanced satellite network service load and unequal terrestrial latitude distances and improve properness and flexibility of service allocation and radio resource allocation, but also avoid unnecessary TAU and save radio resources.

Based on the first aspect, in a possible embodiment, if a beam of a satellite cell covers only one TA, the at least one TAC is a TAC of the one TA; or if a beam of a satellite cell covers two or more TAs, the at least one TAC includes a TAC of each of the two or more TAs. Therefore, in this embodiment of the present invention, the TAC that is broadcast by the satellite cell may be dynamically changed based on a coverage area of the satellite cell.

Based on the first aspect, in a possible embodiment, if a beam of a satellite cell covers only one TA, the at least one TAC is a TAC of the one TA; or if a beam of a satellite cell covers two or more TAs, the at least one TAC is a TAC of a tracking area combination that includes the two or more TAs. Even when the beam covers more TAs, only a TAC corresponding to a tracking area combination into which the TAs are combined needs to be broadcast. Because the coding solution can support non-uniform TA design, no additional information bit overheads are caused.

It can be learned that, in this embodiment of the present invention, the TAC that is broadcast by the satellite cell may be dynamically changed based on the coverage area of the satellite cell, or the satellite cell dynamically adjusts, at different moments, a tracking area size for broadcasting, and no additional bit overheads are caused.

Based on the first aspect, in some non-uniform TA scenarios, the span indication information in the TAC occupies a data length of X bits, the geographical location information in the TAC occupies a data length of Y bits, and a sum of X and Y is equal to 16.

For example, the span indication information occupies a data length of three bits, and the geographical location information occupies a data length of 13 bits.

Based on the first aspect, in some non-uniform TA scenarios, the span indication information in the TAC occupies a data length of X bits, the geographical location information in the TAC occupies a data length of Y bits, and a sum of X and Y is equal to 24.

For example, the span indication information occupies a data length of eight bits, and the geographical location information occupies a data length of 16 bits.

Based on the first aspect, in some uniform TA scenarios, the TAC includes the geographical location information, the geographical location information includes longitude information and latitude information, the longitude information is used to indicate longitude of the preset location point in the TA corresponding to the TAC, and the latitude information is used to indicate latitude of the preset location point in the TA corresponding to the TAC. The longitude information may be designed to occupy a data length of X bits, the latitude information occupies a data length of Y bits, and a sum of X and Y is equal to 16.

According to a second aspect, an embodiment of the present invention provides another satellite tracking area update method. The method includes: A network device broadcasts at least one tracking area code (TAC) to user equipment, where the TAC includes geographical location information, and the geographical location information is used to indicate a geographical location of a preset location point in a tracking area (TA) corresponding to the TAC; the network device receives a tracking area update request from the user equipment, where the tracking area update request is determined by the user equipment based on the TAC and a tracking area list (TAL) of the user equipment; and the network device returns a response message of the tracking area update request to the user equipment.

In this embodiment of the present invention, the TAC and the TAL are designed, so that the TAC that is broadcast by the network device and each TAC in the TAL sent by the network device to the UE implicitly include geographical location range information of corresponding TAs. In this way, the UE can obtain, through parsing based on the TAC, location information of the TA corresponding to the TAC, and determine, based on information in the TAC and TAL, whether to perform TAU. This improves TAU reliability, reduces unnecessary TAU, and saves radio resources.

The network device may be a satellite node or a base station device. When the network device is a satellite node, the one or more TACs may be from a core network device (such as an AMF). If a TAC generation function is already delivered from the core network device to the satellite node, the one or more TACs may be alternatively generated by the satellite node based on a moving track of the satellite node. When the network device is a base station device (such as a cellular base station), the one or more TACs may be from a satellite node.

In a specific implementation, the TAC includes not only the geographical location information but also span indication information, and the span indication information is used to indicate a longitude-direction and/or latitude-direction span of the TA corresponding to the TAC.

Correspondingly, a plurality of different TACs are recorded in the TAL, and each TAC includes respective span indication information and geographical location information.

It can be learned that, in this embodiment of the present invention, the TAC and the TAL are designed, so that the TAC that is broadcast by the network device and each TAC in the TAL sent by the network device to the UE implicitly include geographical location range information of corresponding TAs. The span indication information is introduced, so that this embodiment of the present invention can support non-uniform tracking area design, to adapt to features of unbalanced satellite network service load and unequal terrestrial latitude distances. In this way, the UE can determine, based on information in the TAC and TAL delivered by the network device, whether to perform TAU. This improves TA design flexibility and TAU reliability, reduces unnecessary TAU, and saves radio resources.

Based on the second aspect, in a specific embodiment, a plurality of TAs may be obtained through division based on an area within a preset geographical range, where each TA includes N grid units, and N is a positive integer greater than or equal to 1. Different TAs may include different quantities of grid units, that is, different TAs may be different in size. Sizes of different TAs may be designed in a targeted or differentiated manner based on geographical condition factors, service factors, or the like within ranges of the TAs.

The grid unit represents a quantized geographical area in a minimum dimension in TA design. For example, during specific implementation, a minimum grid unit may be designed as at least one of a rectangle, a circle, an ellipse, a triangle, a rhombus, or a regular hexagon, or a combination of more than one of these shapes.

Correspondingly, the span indication information in the TAC is used to indicate a longitude-direction grid unit quantity and/or latitude-direction grid unit quantity of the tracking area TA corresponding to the TAC.

It can be learned that, in this embodiment of the present invention, the TAC, the TA, and the TAL are designed in a coordinated manner, to support non-uniform TA design, and the broadcast TAC and each TAC in the TAL implicitly include geographical location range information of corresponding TAs. This can not only adapt to the features of unbalanced satellite network service load and unequal terrestrial latitude distances and improve properness and flexibility of service allocation and radio resource allocation, but also avoid unnecessary TAU and save radio resources.

Based on the second aspect, in a possible embodiment, before the network device broadcasts the TAC to the user equipment by using a satellite cell, the network device determines a coverage area of a beam of the satellite cell. If the beam of the satellite cell covers only one TA, the network device determines that the at least one TAC is a TAC of the one TA. If the beam of the satellite cell covers two or more TAs, the network device determines that the at least one TAC includes a TAC of each of the two or more TAs. Therefore, in this embodiment of the present invention, the TAC that is broadcast by the satellite cell may be dynamically changed based on the coverage area of the satellite cell.

Based on the second aspect, in a possible embodiment, before the network device broadcasts the TAC to the user equipment by using a satellite cell, the network device determines a coverage area of a beam of the satellite cell. If the beam of the satellite cell covers only one TA, the network device determines that the at least one TAC is a TAC of the one TA. If the beam of the satellite cell covers two or more TAs, the network device determines that the at least one TAC is a TAC of a tracking area combination that includes the two or more TAs. Even when the beam covers more TAs, only a TAC corresponding to a tracking area combination into which the TAs are combined needs to be broadcast. Because the coding solution can support non-uniform TA design, no additional information bit overheads are caused.

It can be learned that, in this embodiment of the present invention, the TAC that is broadcast by the satellite cell may be dynamically changed based on the coverage area of the satellite cell, or the satellite cell dynamically adjusts, at different moments, a tracking area size for broadcasting, and no additional bit overheads are caused.

Based on the second aspect, in some non-uniform TA scenarios, the span indication information in the TAC occupies a data length of X bits, the geographical location information in the TAC occupies a data length of Y bits, and a sum of X and Y is equal to 16.

Based on the second aspect, in some non-uniform TA scenarios, the span indication information in the TAC occupies a data length of X bits, the geographical location information in the TAC occupies a data length of Y bits, and a sum of X and Y is equal to 24.

Based on the second aspect, in some uniform TA scenarios, the TAC includes the geographical location information, the geographical location information includes longitude information and latitude information, the longitude information is used to indicate longitude of the preset location point in the TA corresponding to the TAC, and the latitude information is used to indicate latitude of the preset location point in the TA corresponding to the TAC. The longitude information may be designed to occupy a data length of X bits, the latitude information occupies a data length of Y bits, and a sum of X and Y is equal to 16.

According to a third aspect, an embodiment of the present invention provides user equipment. The user equipment includes: a receiving module, configured to receive at least one tracking area code (TAC) that is broadcast by a network device, where the TAC includes geographical location information, and the geographical location information is used to indicate a geographical location of a preset location point in a tracking area (TA) corresponding to the TAC; a determining module, configured to determine, based on the TAC and a tracking area list (TAL), whether the TAL needs to be updated; and a sending module, configured to: if it is determined that the TAL needs to be updated, send a tracking area update request to the network device. The receiving module is further configured to receive a response message, of the tracking area update request, returned by the network device.

All the modules of the user equipment are configured to implement the method according to the first aspect.

According to a fourth aspect, an embodiment of the present invention provides a network device. The network device includes: a sending module, configured to broadcast at least one tracking area code (TAC) to user equipment, where the TAC includes geographical location information, and the geographical location information is used to indicate a geographical location of a preset location point in a tracking area (TA) corresponding to the TAC; and a receiving module, configured to receive a tracking area update request from the user equipment, where the tracking area update request is determined by the user equipment based on the TAC and a tracking area list (TAL) of the user equipment. The sending module is further configured to return a response message of the tracking area update request to the user equipment.

All the modules of the network device are configured to implement the method according to the second aspect.

According to a fifth aspect, an embodiment of the present invention provides another apparatus. The apparatus includes a processor, a memory, and a transceiver. The processor, the memory, and the transceiver may be connected to each other by using a bus, or may be integrated with each other. The processor is configured to read program code stored in the memory, to perform the method according to any embodiment of the first aspect or the second aspect.

According to a sixth aspect, an embodiment of the present invention provides another apparatus. The apparatus has a function of implementing behaviors of the user equipment or network device in the foregoing method aspects, and includes corresponding components configured to perform the steps or functions described in the foregoing method aspects. The steps or functions may be implemented by software, hardware (such as a circuit), or a combination of hardware and software.

According to a seventh aspect, an embodiment of the present invention provides another apparatus. During specific implementation, the apparatus may be a chip. The apparatus includes a processor and a memory coupled to or integrated with the processor. The memory is configured to store computer program instructions. The processor is configured to execute a computer program stored in the memory, to implement the method described in any embodiment of the first aspect or the second aspect.

According to an eighth aspect, an embodiment of the present invention provides a satellite communications system. The satellite communications system includes the foregoing user equipment and network device.

According to a ninth aspect, an embodiment of the present invention provides a non-volatile computer-readable storage medium. The computer-readable storage medium is configured to store implementation code of any method according to the first aspect or the second aspect.

According to a tenth aspect, an embodiment of the present invention provides a computer program (product). The computer program (product) includes program instructions. When being executed, the computer program product is used to perform any method according to the first aspect or the second aspect.

It may be understood that any one of the foregoing aspects may be implemented together with any other aspect or aspects, or may be independently implemented.

It can be learned that, in the embodiments of the present invention, the TAC, the TA, and the TAL are designed, so that the broadcast TAC and each TAC in the TAL implicitly include geographical location range information of corresponding TAs, and non-uniform tracking area design is supported, to adapt to the features of unbalanced satellite network service load and unequal terrestrial latitude distances. The UE may determine, based on the information in the TAC and TAL, whether to perform TAU. Moreover, in the embodiments of the present invention, location management requirements of different types of users (that is, with/without GNSS assistance) can be distinguished from each other, to provide differentiated TAU services for users with the GNSS function and users with no GNSS function.

If the newly received TAC does not belong to the TAL, the UE with the GNSS function may determine, by analyzing the positioning information of the UE and the TAC, whether the UE has moved into the corresponding TA. The UE performs TAU only when it is determined that the UE has moved into the corresponding TA. Otherwise, TAU is not performed. This avoids unnecessary TAU, and saves radio resources.

The UE with no GNSS function analyzes whether the TA corresponding to the newly received TAC is an adjacent TA, and needs to further determine, if it is determined that the TA is an adjacent TA, whether the reception frequency of the TAC meets the preset condition. The UE determines to perform TAU, only when the condition is met. Otherwise, TAU is not performed. This greatly reduces unnecessary TAU and saves radio resources.

BRIEF DESCRIPTION OF THE DRAWINGS

To describe the technical solutions in the embodiments of the present invention or in the background more clearly, the following briefly describes the accompanying drawings required for describing the embodiments of the present invention or the background.

DETAILED DESCRIPTION OF ILLUSTRATIVE EMBODIMENTS

The following describes the embodiments of the present invention with reference to the accompanying drawings in the embodiments of the present invention. Terms used in the embodiments of the present invention are merely intended to explain specific embodiments of the present invention, but are not intended to limit the present invention.

Figure 1:
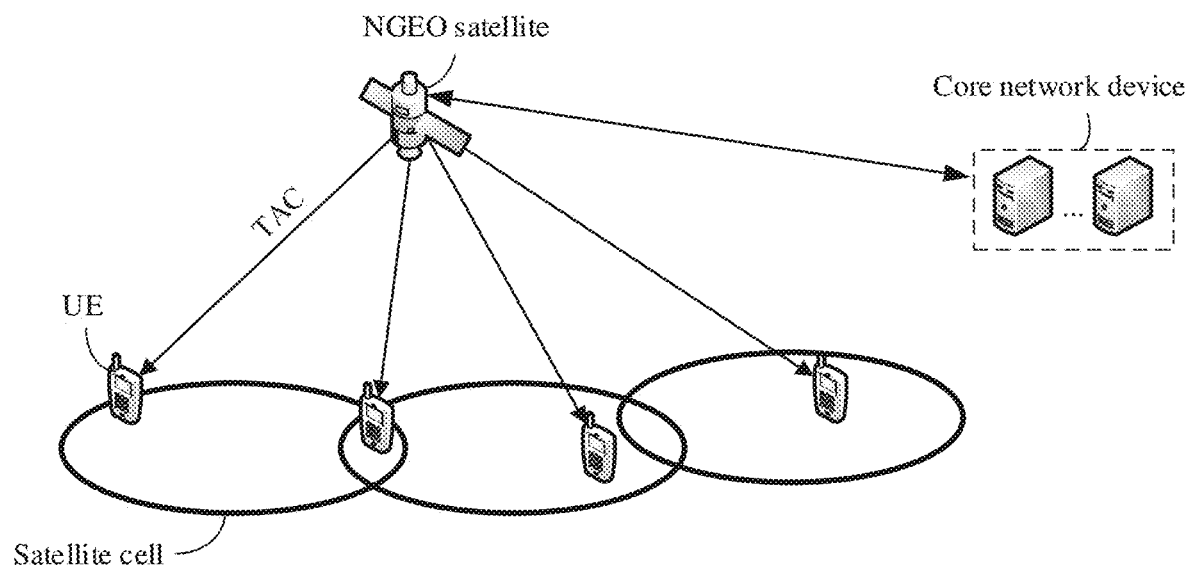
FIG. 1 is a schematic architectural diagram of a satellite communications system according to an embodiment of the present invention.

Refer to FIG. 1. The following describes a satellite communications system used in the embodiments of the present invention. The satellite communications system includes user equipments (UE) and network devices. The network devices may include one or more satellite nodes (for ease of description, only one satellite is shown in the figure, and the satellite may be, for example, an NGEO satellite) and a core network device. The UE may wirelessly communicate with the satellite node, and the satellite node may wirelessly communicate with the core network device.

The satellite node may include an orbit receiver or a relay configured to relay information. The satellite node may perform communication interaction with the core network device, and provide a communication service for the UE.

The core network device is, for example, a device in a core network (CN) of a future mobile communications architecture (such as a 3GPP access architecture of a 5G network). As a bearer network, the core network provides an interface to a data network, provides communication connection, authentication, management, and policy control for the user equipment (UE), bears data services, and the like. The CN may further include network elements such as an access and mobility management network element (AMF), a session management network element (SMF), an authentication server network element (AUSF), a policy control node (PCF), and a user plane function (UPF) network element. The AMF network element is configured to manage access and mobility of the UE, and is mainly responsible for functions such as UE authentication, UE mobility management, and UE paging.

The UE may be any one of a terminal device, a communications device, or an internet of things (IoT) device. The terminal device may be a smartphone, a cellular phone, a smartwatch, a smart tablet computer, a personal digital assistant computer, a laptop computer, or the like. The communications device may be a server, a gateway (GW), a controller, a wireless modem, or the like. The IoT device may be a sensor, a mobile apparatus (such as a bicycle/car/vehicle), or the like.

Figure 2:
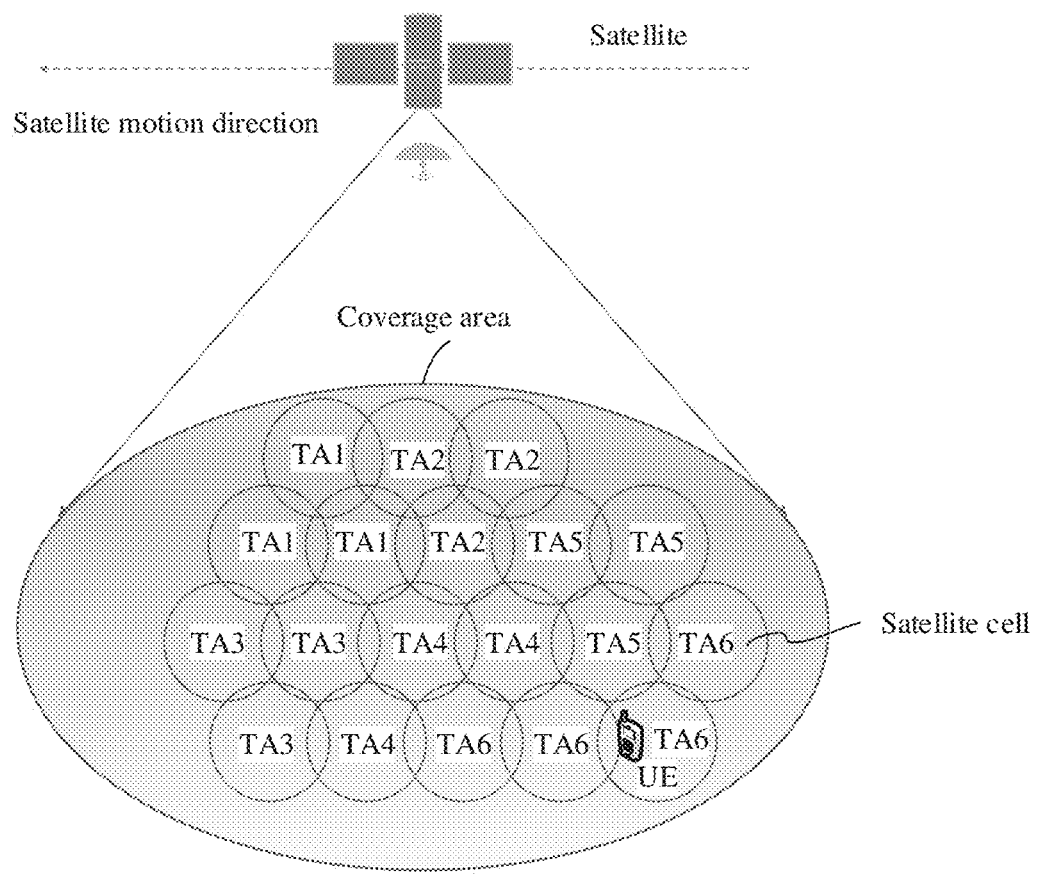
FIG. 2 is a schematic diagram of a scenario for a satellite cell and a tracking area according to an embodiment of the present invention.

As shown in FIG. 2, in the satellite communications system, a coverage area of the satellite is a geographical area that is on a surface of the earth and that is within a signal range of the satellite. The coverage area is usually divided into "satellite cells" by using a beamforming antenna of the satellite. Each beam may correspond to one satellite cell, and each satellite cell covers a geographical area of a specific range. If UE is located in a coverage area of a satellite cell, the satellite may send a signal to and receive a signal from the UE by using the satellite cell, for example, may page the UE by using the satellite cell. In UE location management, one satellite cell belongs to only one tracking area (TA), and one TA may include a plurality of satellite cells.

Figure 3:
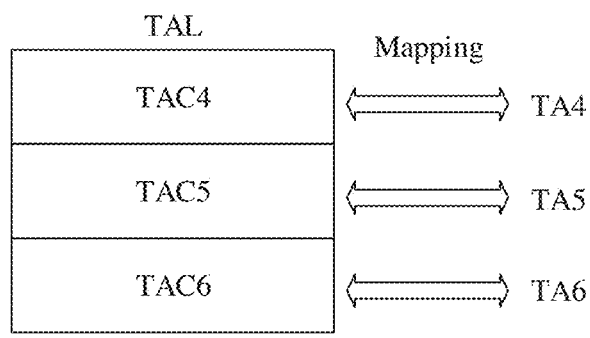
FIG. 3 is a schematic diagram of a tracking area list according to an embodiment of the present invention.

After the UE registers with the core network, the core network device may allocate a tracking area list (TAL) to the UE. The TAL may include a plurality of TACs, and different TACs respectively correspond to different TAs. For example, in a scenario shown in FIG. 2, when the UE is located in an area TA6, an example of a configured TAL is shown in FIG. 3. The TAL includes, for example, a TAC4, a TAC5, and a TAC6. The different TACs respectively correspond to different TAs (for example, correspond to a TA4, a TA5, and the TA6). When the UE in idle mode needs to be paged, paging may be performed in satellite cells of all TAs corresponding to the TAL, or paging may be performed in a satellite cell of some of TAs in the TAL according to some optimization algorithms. The UE needs to perform a tracking area update (TAU) process only after the UE moves out of each TA area in the current TAL, and in this case, the core network device reallocates a TAL to the UE.

It should be noted that, in this embodiment of the present invention, for ease of describing functions of entities, an example in which the core network device and the satellite exist independently of each other is used for description. However, in some cases, some or all of functions of the core network device may be directly integrated and deployed on the satellite. This is not limited in the present invention.

Figure 4:
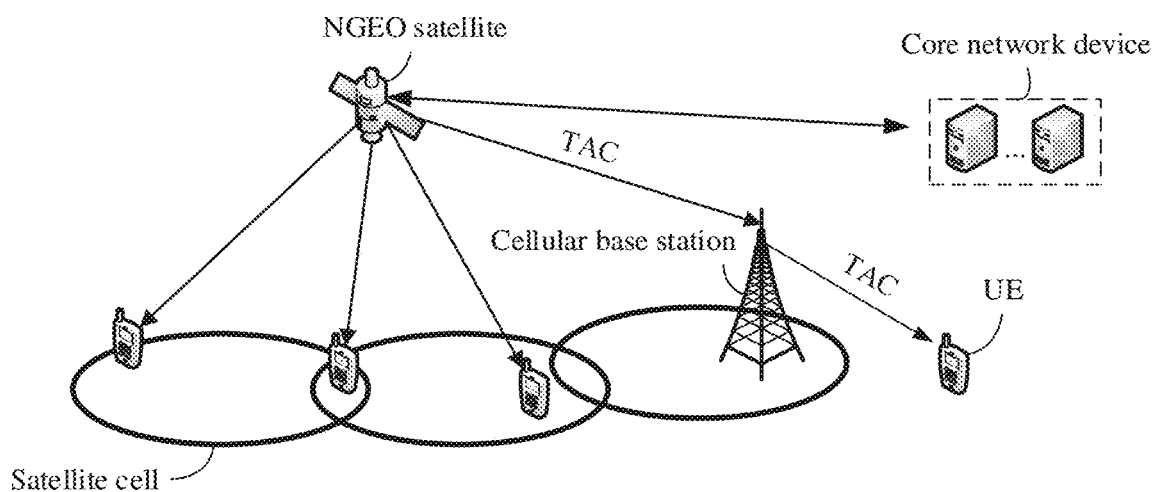
FIG. 4 is a schematic architectural diagram of another satellite communications system according to an embodiment of the present invention.

Refer to FIG. 4. The following describes another satellite communications system used in the embodiments of the present invention. The satellite communications system includes user equipments (UE) and network devices. The network devices may include one or more satellite nodes (for ease of description, only one satellite is shown in the figure, and the satellite may be, for example, an NGEO satellite), a core network device, and a base station device. The UE may wirelessly communicate with the satellite node. The UE may also wirelessly communicate with the base station device. The satellite node may wirelessly communicate with the core network device. The satellite node may also wirelessly communicate with the base station device.

The satellite node may include an orbit receiver or a relay configured to relay information. The satellite node may perform communication interaction with the core network device, and provide a communication service for the UE.

The base station device may be, for example, a cellular base station or a gateway device. The base station device is a terrestrial station with an antenna configured to send a signal to the satellite and receive a signal from the communications satellite. The base station device uses the satellite to provide a communication link used for connecting the UE to another UE or the core network device.

The core network device is, for example, a device in a core network of a future mobile communications architecture (such as a 3GPP access architecture of a 5G network). As a bearer network, the core network provides an interface to a data network, provides communication connection, authentication, management, and policy control for the user equipment (UE), bears data services, and the like. The CN may further include an AMF network element, an SMF network element, an AUSF network element, a PCF network element, a UPF network element, and the like. The AMF network element is configured to manage access and mobility of the UE, and is mainly responsible for functions such as UE authentication, UE mobility management, and UE paging.

The UE may be any one of a terminal device, a communications device, or an internet of things device. The terminal device may be a smartphone, a cellular phone, a smartwatch, a smart tablet computer, a personal digital assistant computer, a laptop computer, or the like. The communications device may be a server, a gateway, a controller, a wireless modem, or the like. The IoT device may be a sensor, a mobile apparatus (such as a bicycle/car/vehicle), or the like.

In the satellite communications system, if the base station device is located in a coverage area of a satellite cell, the satellite may send a signal to and receive a signal from the base station device by using the satellite cell. The base station device may communicate with UE located in a cell (for example, a cellular cell) of the base station device. For example, the satellite may use the base station device to page the UE by using the satellite cell. In this way, communication can be expanded by using the base station device, so that UE in an environment (for example, an indoor environment) in which receiving a satellite signal is not convenient can also communicate with the satellite based on forwarding of the base station device.

It should be noted that, in this embodiment of the present invention, for ease of describing functions of entities, an example in which the core network device, the base station, and the satellite exist independently of each other is used for description. However, in some cases, some or all of functions of the core network device may be directly integrated and deployed on the satellite, or integrated and deployed on the base station. This is not limited in the present invention.

It should be further noted that, for brevity of the specification, the technical solutions are described in this specification mainly based on the satellite communications system shown in FIG. 1. Based on the technical idea, a person skilled in the art can perform similar implementation of the technical solutions based on the satellite communications system shown in FIG. 4. Details are not described in this specification.

The following describes some design manners for a tracking area (TA) in the embodiments of the present invention.

In the embodiments of the present invention, a plurality of TAs may be obtained through division based on an area within a preset geographical range, where each TA includes N grid units, and N is a positive integer greater than or equal to 1. Different TAs may include different quantities of grid units, that is, different TAs may be different in size. Sizes of different TAs may be designed in a targeted or differentiated manner based on geographical condition factors, service factors, or the like within ranges of the TAs.

The grid unit represents a quantized geographical area in a minimum dimension in TA design. For example, during specific implementation, a minimum grid unit may be designed as at least one of a rectangle, a circle, an ellipse, a triangle, a rhombus, or a regular hexagon, or a combination of more than one of these shapes.

The area that is within the preset geographical range and that is divided into the plurality of TAs based on the foregoing method may be, for example, one or more municipal areas, one or more provincial areas, one or more regional areas, one or more national areas, one or more continental areas, or even a global area. Certainly, the area within the preset geographical range may be alternatively an area determined in another manner. This is not limited in the embodiments of the present invention.

Figure 5:
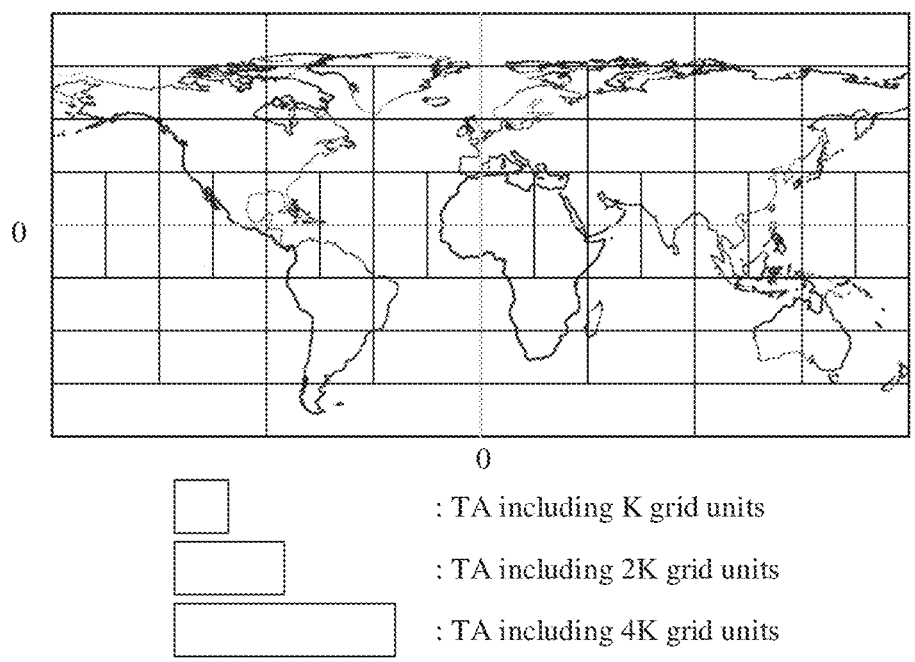
FIG. 5 is a schematic diagram of non-uniform tracking areas according to an embodiment of the present invention.

[ono] For example, a TA design example is shown in FIG. 5. A grid unit may be a rectangular area of a specific size, and an area within a preset geographical range may be divided into a plurality of TAs of non-uniform sizes. A feature of non-uniform terrestrial latitude distances and a feature of uneven service distribution are considered. To be specific, on different latitude lines of the earth, distances for a change by 1 degree of longitude are different, and such a difference is obvious. In addition, most services on the earth are distributed in mid-latitude and low-latitude regions, whereas service traffic in high-latitude and polar regions is extremely low or even 0. Therefore, lower-latitude TAs may be designed to be denser and higher-latitude TAs are sparser. For example, in the example in FIG. 5, a TA in a low-latitude region may include K grid units, a TA in a mid-latitude region may include 2K grid units, and a TA in a high-latitude region may include 4K grid units, where K is an integer greater than or equal to 1. It should be noted that the foregoing example is merely intended to explain rather than limit the technical solutions of the present invention.

Figure 6:
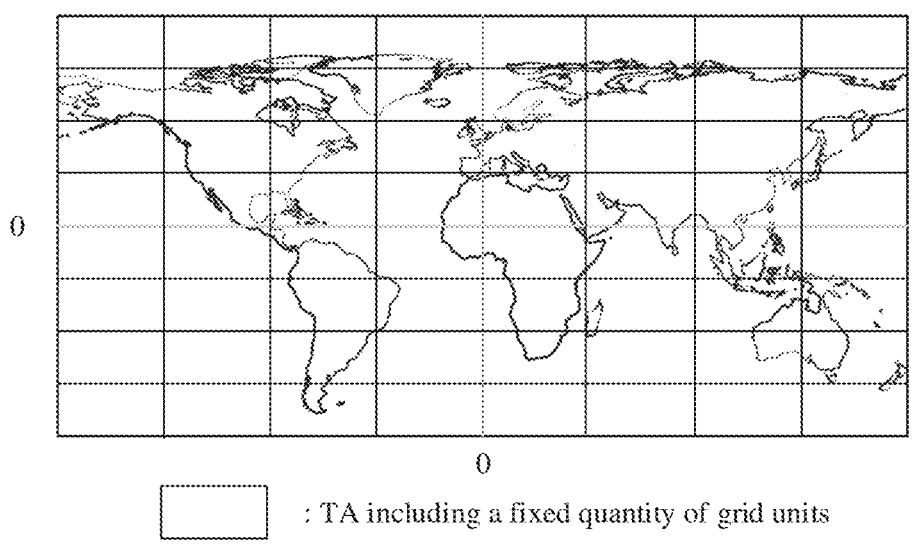
FIG. 6 is a schematic diagram of uniform tracking areas according to an embodiment of the present invention.

For another example, another TA design example is shown in FIG. 6. A grid unit may be a rectangular area of a specific size, and an area within a preset geographical range may be divided into a plurality of TAs of uniform sizes. For example, in the example in FIG. 6, each TA of the uniform size may include a fixed quantity of grid units, and the fixed quantity is an integer greater than or equal to 1. It should be noted that the foregoing example is merely intended to explain rather than limit the technical solutions of the present invention.

The following describes a coding manner for a tracking area code (TAC) in the embodiments of the present invention.

In the embodiments of the present invention, for ease of TAC design and planning, a benchmark reference location, that is, a reference location for coding, may be predetermined, and may be designed as any longitude-and-latitude location (x0, y0), where x0 represents longitude, and y0 represents latitude. A default value may be, for example, (0, 0).

In the embodiments of the present invention, for a case of non-uniform TA design, a TAC corresponding to a TA may be designed to include at least span indication information and geographical location information. The span indication information is used to indicate a longitude-direction and/or latitude-direction span of the TA corresponding to the TAC. The geographical location information is used to indicate a geographical location of a preset location point in the TA corresponding to the TAC. The geographical location of the preset location point may be, for example, longitude and latitude information of a central geographical location point of the TA, or may be, for example, longitude and latitude information of an edge location point of the TA, or may be, for example, longitude and latitude information of a start location point of the TA, or may be, for example, longitude and latitude information of an end location point of the TA. This is not limited in the present invention.

The span indication information is used to indicate a longitude-direction grid unit quantity and/or latitude-direction grid unit quantity of the tracking area TA corresponding to the TAC.

Figure 7:
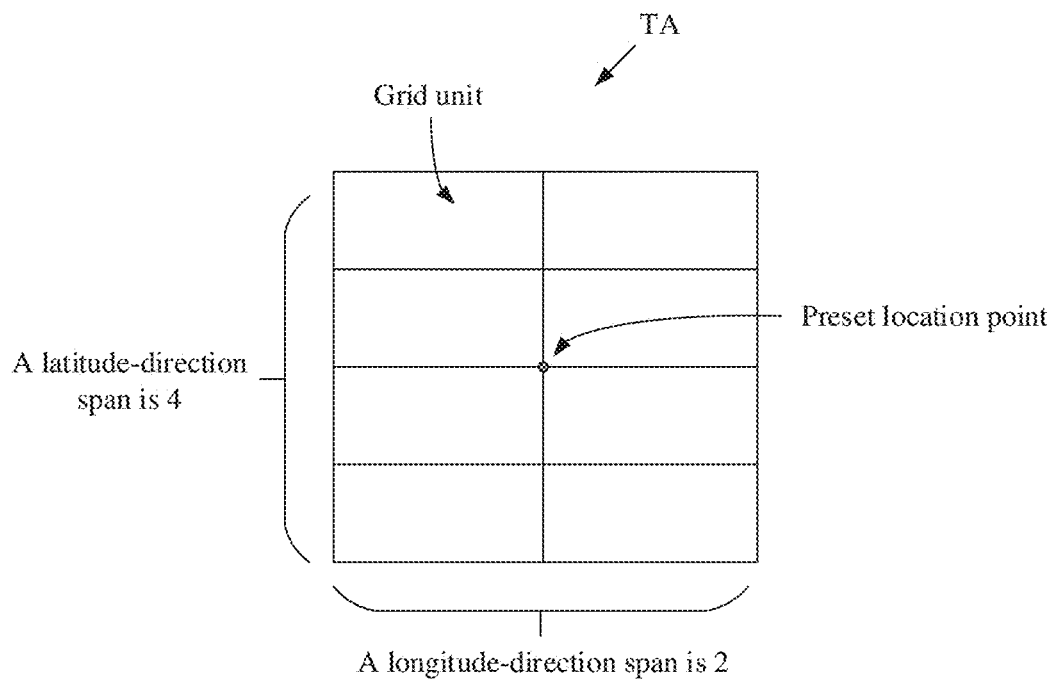
FIG. 7 is a schematic diagram of a scenario of a tracking area according to an embodiment of the present invention.

For example, a specific implementation is shown in FIG. 7. One TA may be designed to include eight grid units, a geographical location of a preset location point in the TA is longitude and latitude information of a geometric center location point of the TA, and a span of the TA may include four grid units in a latitude direction and may include two grid units in a longitude direction. In this case, a TAC corresponding to the TA may be designed to include the longitude and latitude information of the geometric center location point and longitude-direction and latitude-direction span values.

For another example, in another specific implementation, a span of a TA is designed to include N grid units in a latitude direction and include only one grid unit in a longitude direction (that is, a longitude-direction span value is 1 by default), and a geographical location of a preset location point in the TA is, for example, longitude and latitude information of a geometric center location point (or another location point) of the TA. In this case, a TAC corresponding to the TA may be designed to include the longitude and latitude information of the geometric center location point (or another location point) and a latitude-direction span value.

For another example, in another specific implementation, a span of a TA is designed to include N grid units in a longitude direction and includes only one grid unit in a latitude direction (that is, a latitude-direction span value is 1 by default), and a geographical location of a preset location point in the TA is, for example, longitude and latitude information of a geometric center location point (or another location point) of the TA. In this case, a TAC corresponding to the TA may be designed to include the longitude and latitude information of the geometric center location point (or another location point) and a longitude-direction span value.

In the embodiments of the present invention, for a case of uniform TA design, a TAC corresponding to a TA may be designed to include at least geographical location information. The geographical location information is used to indicate a geographical location of a preset location point in the TA corresponding to the TAC. The geographical location of the preset location point may be, for example, longitude and latitude information of a central geographical location point of the TA, or may be, for example, longitude and latitude information of an edge location point of the TA. This is not limited in the present invention. In this case, a longitude-direction and/or latitude-direction span of the TA may be set to a default value.

In the embodiments of the present invention, for a case of uniform TA design, a TAC corresponding to a TA may be alternatively designed to include at least span indication information and geographical location information. The span indication information is used to indicate a longitude-direction and/or latitude-direction span of the TA corresponding to the TAC. The geographical location information is used to indicate a geographical location of a preset location point in the TA corresponding to the TAC.

The following further describes some specific data structures of a TAC in the embodiments of the present invention.

In a specific embodiment, a TAC includes both span indication information and geographical location information. The TAC may be designed to include a data length of N bits, where the span indication information occupies a data length of X bits, the geographical location information occupies a data length of Y bits, and a sum of X and Y is equal to N. X and Y are non-negative integers.

The span indication information may be decomposed into longitude indication information and latitude indication information. The longitude indication information is used to indicate a longitude-direction span of a TA corresponding to the TAC. The latitude indication information is used to indicate a latitude-direction span of the TA corresponding to the TAC. The geographical location information may be decomposed into longitude information and latitude information. The longitude information is used to indicate longitude of a preset location point in the TA corresponding to the TAC. The latitude information is used to indicate latitude of the preset location point in the TA corresponding to the TAC. In this case, the longitude indication information and the longitude information may also be collectively referred to as first information, and the latitude indication information and the latitude information may also be collectively referred to as second information.

Figure 8:
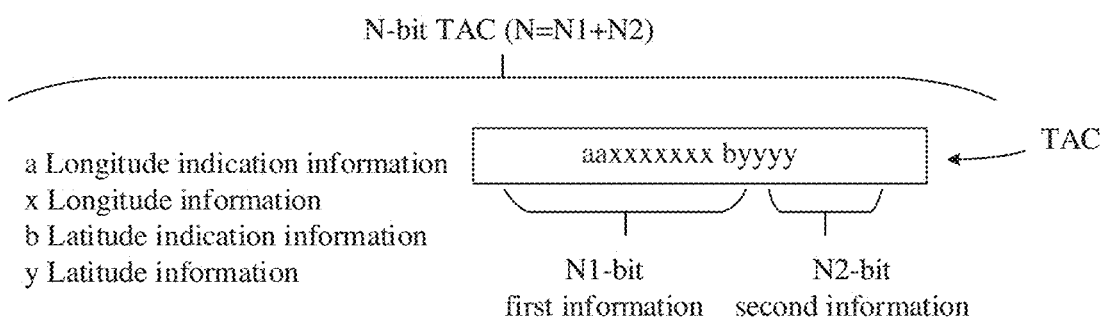
FIG. 8 is a schematic diagram of a scenario of a tracking area code according to an embodiment of the present invention.

For example, FIG. 8 shows a TAC data structure, including N1-bit first information and N2-bit second information. The first information includes longitude indication information and longitude information, and the second information includes latitude indication information and latitude information. A sum of N1 and N2 is equal to N, and N may be, for example, 16 or 24.

It should be noted that the foregoing data structure is merely intended to explain rather than limit the technical solutions of the present invention. Specific arrangement locations and a sequence of longitude indication information, longitude information, latitude indication information, and latitude information in a TAC coding framework are not limited.

The following provides a reused existing coding solution of a TAC that is 16 bits long. The solution can support non-uniform TA design.

The TAC includes both span indication information and geographical location information. The TAC may be designed to include a data length of 16 bits, where the span indication information occupies a data length of X bits, the geographical location information occupies a data length of Y bits, and a sum of X and Y is equal to 16.

For example, a grid unit may be designed as a square area of "5° of longitude times 5° of latitude". In this case, a TAC data structure may be designed as follows: First information occupies nine bits, including 2-bit longitude indication information (00, 01, 10, and 11 respectively represent spanning one longitude unit, two longitude units, three longitude units, and four longitude units, where one longitude unit is 5 degrees) and 7-bit longitude information of a TA endpoint location (longitude of the earth is 360 degrees, and is quantized in units of 5 degrees, that is, corresponds to a maximum of 72 quantization units, each of which may be represented by seven bits); and second information occupies seven bits, including 1-bit latitude indication information and 6-bit latitude information of the TA endpoint location (latitude of the earth is 180 degrees, and is quantized in units of 5 degrees, that is, corresponds to a maximum of 36 quantization units, each of which may be represented by six bits). It should be noted that, because latitude is uniform, a bit quantity of the latitude indication information may be alternatively set to 0, and saved one bit may be alternatively used as a spare bit. It can be learned that, in this case, the span indication information (including the longitude indication information and the latitude indication information) in the TAC occupies three bits, that is, X=3, and the geographical location information (including the longitude information and the latitude information) in the TAC occupies 13 bits, that is, Y=13.

Figure 9A:
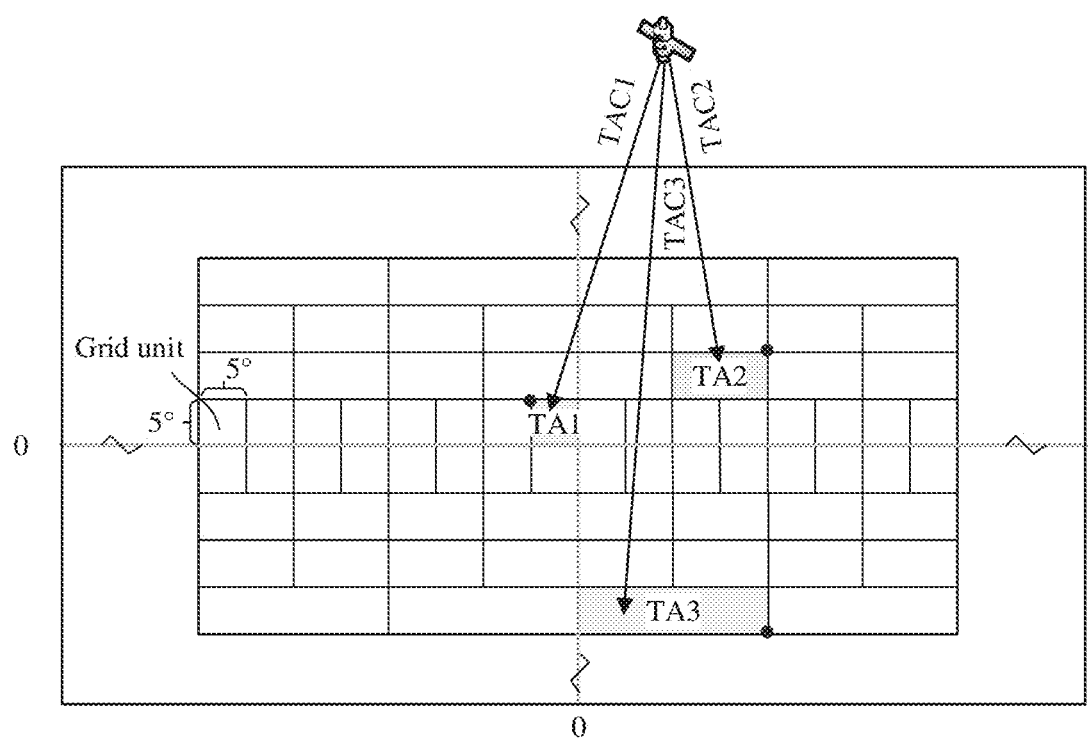
FIG. 9a is a schematic diagram of another scenario of a tracking area code according to an embodiment of the present invention.

As shown in FIG. 9a, in an application scenario, non-uniform TA design may be performed on an area within a preset geographical range, and a grid unit is designed as a square area of "5° of longitude times 5° of latitude". As shown in the figure, an area TA1 includes one grid unit, an area TA2 includes two grid units, and an area TA3 includes three grid units. The three TAs of different sizes respectively correspond to a TAC1, the TAC2, and a TAC3. Specific coding results of the corresponding TACs are as follows:

TAC1: 000000001 0100001
TAC2: 011000100 0100010
TAC3: 111000100 0000100

The TAC3 is used as an example. The first two bits (that is, ii) of first information indicate that the TA3 spans four longitude units (that is, spans four grid units in a longitude direction). The last seven bits (that is, 100100) of the first information indicate longitude of an endpoint location of the TA3 (a location at a lower right corner of the TA3 in the figure), where 1 represents a direction to the east of a benchmark reference location (0, 0), and 000100 represents the longitude of the endpoint location of the TA3. The first one bit (that is, 0) of second information indicates that the TA3 spans one latitude unit (that is, spans one grid unit in a latitude direction). The last six bits (that is, 000100) of the second information indicate latitude of the endpoint location of the TA3.

Span indication information (including longitude indication information and latitude indication information of the TA3) in the TAC3 occupies three bits, and geographical location information (including longitude information and latitude information of the endpoint location of the TA3) in the TAC3 occupies a total of 13 bits. That is, X=3, and Y=13.

It should be noted that the foregoing related descriptions of FIG. 9a are merely intended to explain rather than limit the technical solutions in the embodiments of the present invention. Specific values of X and Y only need to be agreed upon by a transmit end and a receive end.

It can be learned that, this embodiment provides a coding method of a TAC that is 16 bits long in a non-uniform TA scenario, so that UE can obtain, through parsing based on the received 16-bit TAC, location information of a TA corresponding to the TAC, to assist a TAU process of the UE. This better reuses the existing coding solution, and improves coding efficiency and technical practicability.

In addition, in the embodiments of the present invention, TAC design may be alternatively performed based on different data lengths and different precision depending on an actual requirement. The following provides a coding solution of a TAC that is 24 bits long. The solution can support non-uniform TA design.

The TAC includes both span indication information and geographical location information. The TAC may be designed to include a data length of 24 bits, where the span indication information occupies a data length of X bits, the geographical location information occupies a data length of Y bits, and a sum of X and Y is equal to 24.

For example, a grid unit may be designed as a rectangular area of "2° of longitude times 1° of latitude". In this case, a TAC data structure may be designed as follows: First information occupies 12 bits, including 4-bit longitude indication information (indicating a maximum of 16 longitude spans) and 8-bit longitude information of a TA endpoint location (longitude of the earth is 360 degrees, and is quantized in units of 2 degrees, that is, corresponds to a maximum of 180 quantization units, each of which may be represented by eight bits); and second information occupies 12 bits, including 4-bit latitude indication information (indicating a maximum of 16 latitude spans) and 8-bit latitude information of the TA endpoint location (latitude of the earth is 180 degrees, and is quantized in units of 1 degree, that is, corresponds to a maximum of 180 quantization units, each of which may be represented by eight bits).

It can be learned that, in this case, the span indication information (including the longitude indication information and the latitude indication information) in the TAC occupies eight bits, that is, X=8, and the geographical location information (including the longitude information and the latitude information) in the TAC occupies 16 bits, that is, Y=16.

According to the foregoing coding rule, using the TA3 corresponding to FIG. 9a as an example, endpoint location information of the TA3 is (20, −20), a longitude span of the TA3 is 20/2=10 longitude units (that is, the TA3 spans 10 grid units in a longitude direction), and a latitude span of the TA3 is 5/1=5 latitude units (that is, the TA3 spans five grid units in a latitude direction). In this case, a specific coding result of the TAC3 corresponding to the TA3 is as follows:

TAC3: 101010001010 100100001010

It should be noted that the related descriptions of the foregoing example are merely intended to explain rather than limit the technical solutions in the embodiments of the present invention. Specific values of X and Y only need to be agreed upon by a transmit end and a receive end.

It can be learned that, this embodiment provides a coding method of a TAC that is 24 bits long in a non-uniform TA scenario, so that UE can obtain, through parsing based on the received 24-bit TAC, location information of a TA corresponding to the TAC, to assist a TAU process of the UE. Location precision and a tracking area span thereof exceed those of a 16-bit TAC. In the embodiments of the present invention, a TAC coding manner may be adjusted to adapt to TA design with different lengths and different precision. This improves coding precision and technical practicability.

The following provides a reused existing coding solution of a TAC that is 16 bits long. The solution can support uniform TA design.

The TAC includes geographical location information, the geographical location information includes longitude information and latitude information, the longitude information is used to indicate longitude of a preset location point in a TA corresponding to the TAC, and the latitude information is used to indicate latitude of the preset location point in the TA corresponding to the TAC. The TAC may be designed to include a data length of 16 bits, where the longitude information occupies a data length of X bits, the latitude information occupies a data length of Y bits, and a sum of X and Y is equal to 16.

Figure 9B:
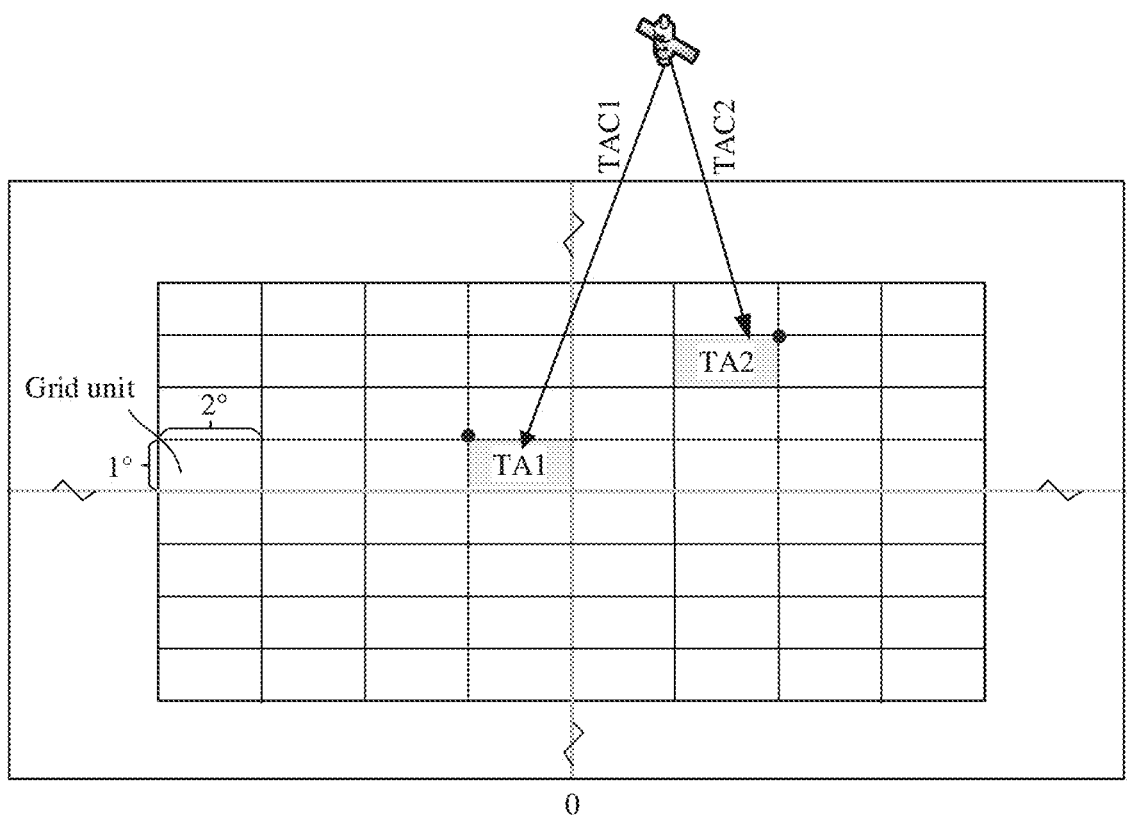
FIG. 9b is a schematic diagram of another scenario of a tracking area code according to an embodiment of the present invention.

As shown in FIG. 9b, in an application scenario, uniform TA design may be performed on an area within a preset geographical range, and a grid unit is designed as a rectangular area of "2° of longitude times 1° of latitude". One TA may include one or more grid units, and each TA includes a same quantity of grid units. In FIG. 9b, a case in which the TA includes one grid unit is used as an example for description. In this case, a TAC data structure may be designed as follows: Longitude information occupies eight bits (longitude of the earth is 360 degrees, and is quantized in units of 2 degrees, that is, corresponds to a maximum of 180 quantization units, each of which may be represented by eight bits); and latitude information occupies eight bits (latitude of the earth is 180 degrees, and is quantized in units of 1 degree, that is, corresponds to a maximum of 180 quantization units, each of which may be represented by eight bits).

This case may be understood as follows: Geographical location information (including the longitude information and the latitude information) in a TAC occupies 16 bits, that is, Y=16, and span indication information in the TAC occupies zero bit, that is, X=0. Each of the longitude information and latitude information in the geographical location information occupies eight bits.

An area TA1 and an area TA2 that are shown in the figure correspond to a TAC1 and the TAC2, respectively. Specific coding results of the corresponding TACs are as follows:

TAC1: 00000001 10000001
TAC2: 10000010 10000011

The TAC1 is used as an example. The first eight bits (that is, 00000001) indicate longitude of an endpoint location of the TA1 (a location at an upper left corner of the TA1 in the figure), where 0 represents a direction to the west of a benchmark reference location (0, 0), and 0000001 represents the longitude of the endpoint location of the TA1. The last eight bits (that is, 10000001) indicate latitude of the endpoint location of the TA1, where 1 represents a direction to the north of the benchmark reference location (0, 0), and 0000001 represents the latitude of the endpoint location of the TA1.

It should be noted that the foregoing related descriptions of FIG. 9b are merely intended to explain rather than limit the technical solutions in the embodiments of the present invention. Specific values of X and Y only need to be agreed upon by a transmit end and a receive end.

It can be learned that, this embodiment provides a coding method of a TAC that is 16 bits long in a uniform TA scenario, so that UE can obtain, through parsing based on the received 16-bit TAC, location information of a TA corresponding to the TAC, to assist a TAU process of the UE. This better reuses the existing coding solution, and improves coding efficiency and technical practicability.

Figure 10:
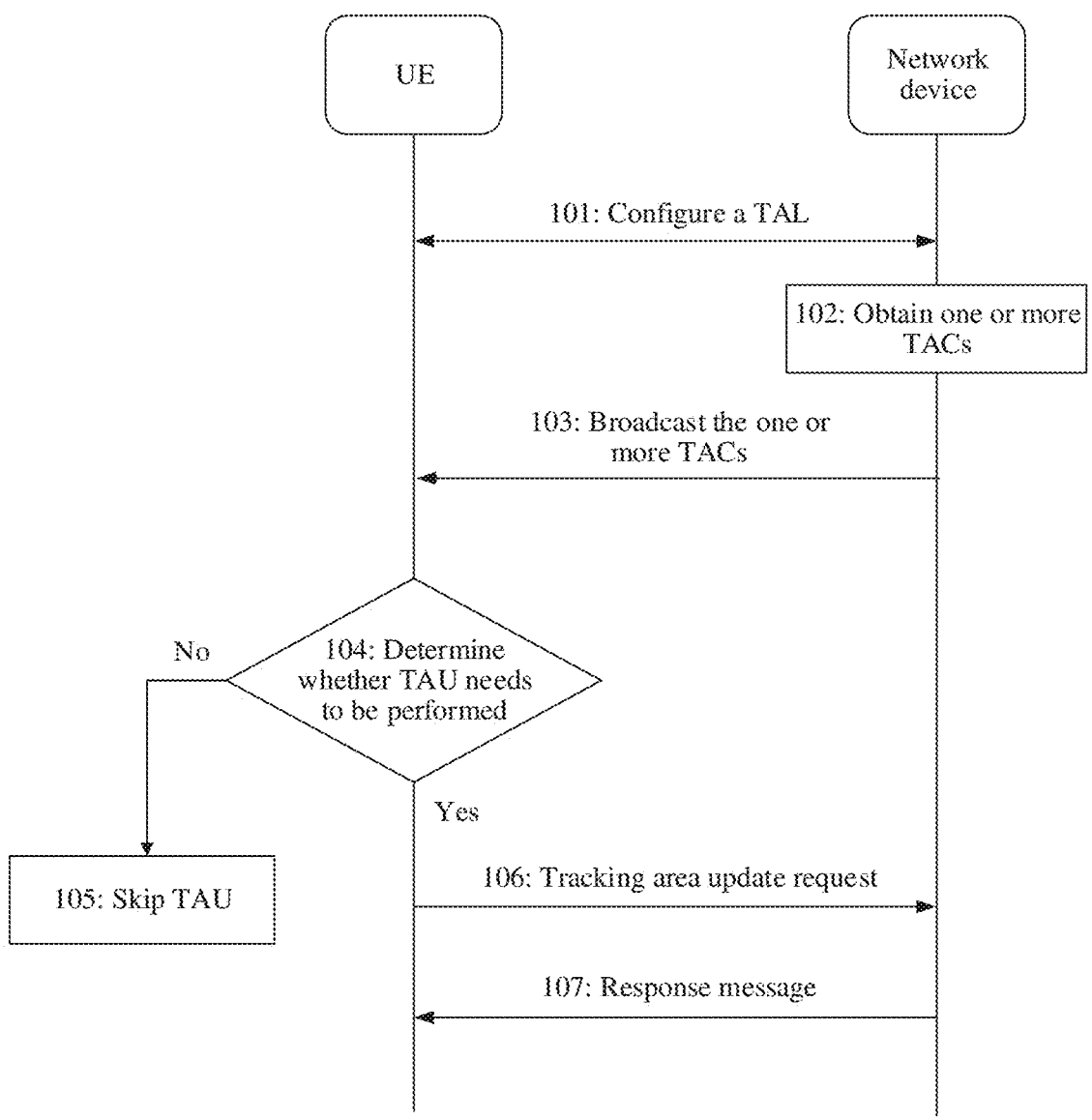
FIG. 10 is a schematic flowchart of a satellite tracking area update method according to an embodiment of the present invention.

Based on the foregoing related descriptions, the following describes a satellite tracking area update method provided in the embodiments of the present invention. FIG. 10 is a schematic flowchart of a satellite tracking area update method according to an embodiment of the present invention. The method includes but is not limited to the following steps.

S101: Configure a tracking area list (TAL) for UE.

For example, after registering with a network or after updating a local tracking area list of the UE, the UE may obtain the tracking area list (TAL). The TAL includes a plurality of TACs, and different TACs correspond to different TAs. A TAC design manner in this embodiment of the present invention is also described above, and details are not described herein again.

In this embodiment of the present invention, a network side performs division into TAs according to a specific rule (for example, based on a region or a service). Non-uniform or uniform TA design may be performed. A TA design manner in this embodiment of the present invention is described above, and details are not described herein again.

S102: A network device obtains one or more tracking area codes (TAC).

In this embodiment of the present invention, the network device may be a satellite node or a base station device. When the network device is a satellite node, the one or more TACs may be from a core network device (such as an AMF). If a TAC generation function is already delivered from the core network device to the satellite node, the one or more TACs may be alternatively generated by the satellite node based on a moving track of the satellite node. When the network device is a base station device (such as a cellular base station), the one or more TACs may be from a satellite node.

In some embodiments, for a case of non-uniform TA design, a TAC corresponding to a TA may be designed to include at least span indication information and geographical location information. The span indication information is used to indicate a longitude-direction and/or latitude-direction span of the TA corresponding to the TAC. The geographical location information is used to indicate a geographical location of a preset location point in the TA corresponding to the TAC.

In some other embodiments, for a case of uniform TA design, a TAC corresponding to a TA may be designed to include at least geographical location information. The geographical location information is used to indicate a geographical location of a preset location point in the TA corresponding to the TAC.

In this embodiment of the present invention, a TAC data length may be 16 bits, 24 bits, or another length. Some TAC coding manners in specific examples are described above in detail. For brevity of the specification, details are not described herein again.

S103: The network device broadcasts the one or more TACs.

In some embodiments, if a beam corresponding to a satellite cell of a satellite covers only one TA, the at least one TAC is a TAC of the one TA; or if a beam corresponding to a satellite cell of a satellite covers two or more TAs, the at least one TAC includes a TAC of each of the two or more TAs.

Figure 11:
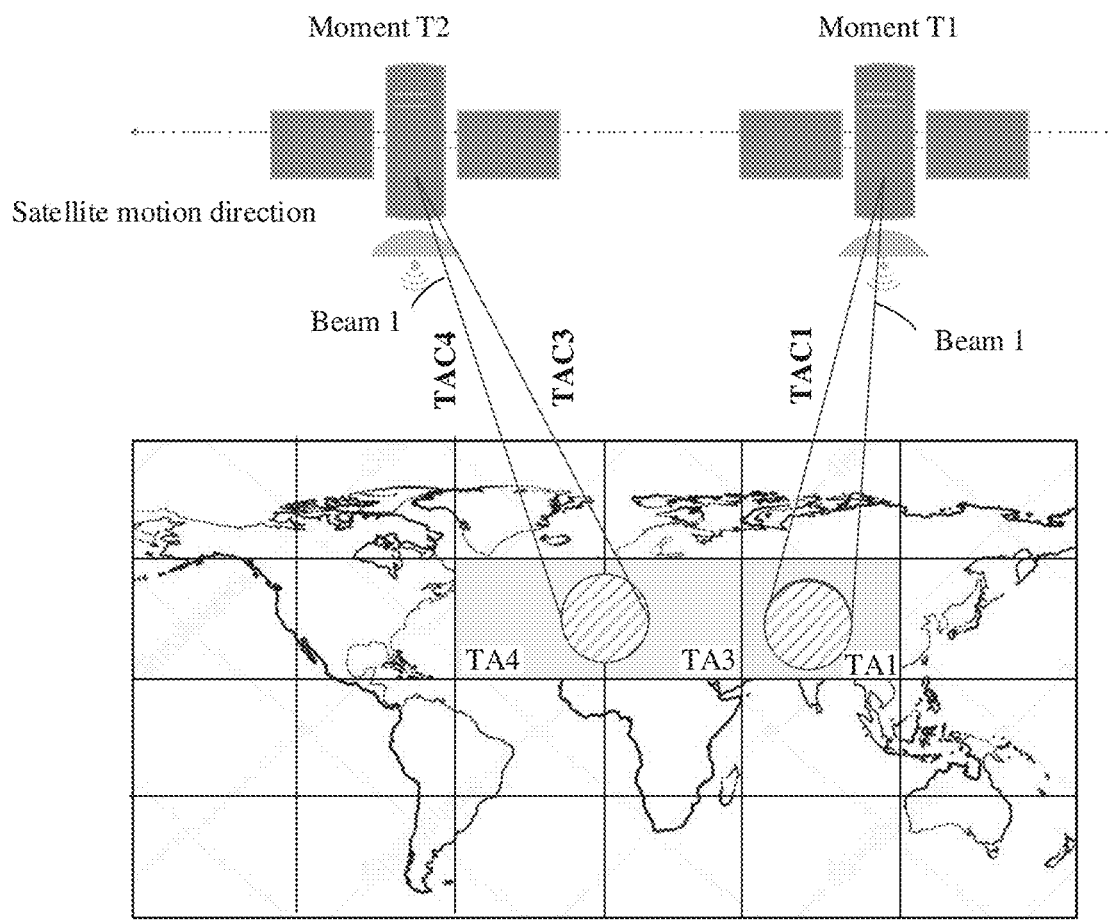
FIG. 11 is a schematic diagram of a scenario of broadcasting a tracking area code according to an embodiment of the present invention.

As shown in FIG. 11, in an application scenario, during satellite motion around the earth, one or more beams are transmitted to the ground by using a beamforming antenna of a satellite. At a moment T1, when a beam 1 of the satellite covers an area TA1 (or when a center point of a beam 1 of the satellite is located in an area TA1), the satellite broadcasts a TAC1 (that is, a TAC corresponding to the TA1) to the area TA1 by using a satellite cell (the beam 1). At a moment T2, when the beam 1 of the satellite covers both an area TA3 and an area TA4 (or when the center point of the beam 1 of the satellite is located at a bordering location or an overlapping location between an area TA3 and an area TA4), the satellite broadcasts a TAC3 (that is, a TAC corresponding to the TA3) and a TAC4 (that is, a TAC corresponding to the TA4) by using the satellite cell (the beam 1).

In some embodiments, if a beam corresponding to a satellite cell of a satellite covers only one TA, the at least one TAC is a TAC of the one TA; or if a beam corresponding to a satellite cell of a satellite covers two or more TAs, the at least one TAC is a TAC of a tracking area combination that includes the two or more TAs.

Figure 12:
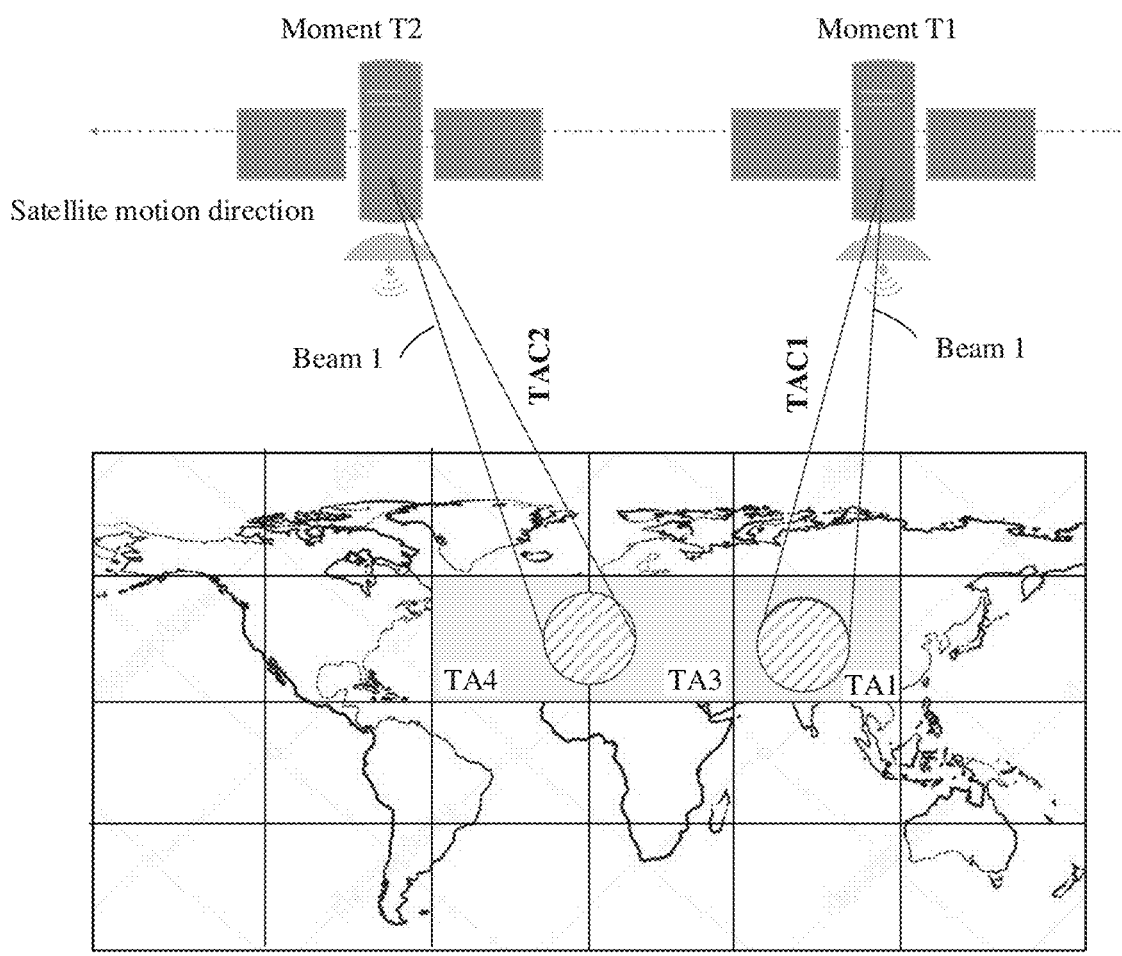
FIG. 12 is a schematic diagram of another scenario of broadcasting a tracking area code according to an embodiment of the present invention.

As shown in FIG. 12, in an application scenario, during satellite motion around the earth, one or more beams are transmitted to the ground by using a beamforming antenna of a satellite. At a moment T1, when a beam 1 of the satellite covers an area TA1 (or when a center point of a beam 1 of the satellite is located in an area TA1), the satellite broadcasts a TAC1 (that is, a TAC corresponding to the TA1) to the area TA1 by using a satellite cell (the beam 1). At a moment T2, when the beam 1 of the satellite covers both an area TA3 and an area TA4 (or when the center point of the beam 1 of the satellite is located at a bordering location or an overlapping location between an area TA3 and an area TA4), if an area into which the area TA3 and the area TA4 are combined is defined as an area TA2, a TAC corresponding to the TA combination area may be broadcast by the satellite cell (the beam 1), that is, the satellite may broadcast a TAC2 (the TAC corresponding to the TA2) by using the satellite cell (the beam 1).

It may be understood that, even when the beam covers more TAs, only a TAC corresponding to a tracking area combination into which the TAs are combined needs to be broadcast. Because the coding solution can support non-uniform TA design, no additional information bit overheads are caused.

S104: The UE determines, based on the received TAC and the local TAL, whether tracking area update (TAU) needs to be performed.

The UE may periodically listen for a TAC, and after receiving the one or more TACs from the network device, the UE determines, based on the received TAC and the local TAL, whether TAU needs to be performed.

In a specific embodiment, the UE may query the local TAL of the UE based on the received TAC, to determine whether the TAC is recorded in the TAL. The user equipment determines, if the TAC is not recorded in the TAL, whether the user equipment has moved into the TA corresponding to the TAC. If it is determined that the user equipment has moved into the TA corresponding to the TAC, the user equipment determines that the TAL needs to be updated (that is, S106 and S107 are subsequently performed). If it is determined that the user equipment has not moved into the TA corresponding to the TAC, the user equipment determines that the TAL does not need to be updated (that is, S105).

S105: If it is determined in S104 that TAU does not need to be performed, skip a TAU operation.

S106: If it is determined in S104 that TAU needs to be performed, the UE sends a tracking area update request to the network device.

In a specific embodiment, the UE may send the tracking area update request to the core network device (such as the AMF), to notify the core network device that the UE has moved out of a current TA area, and re-register, with a core network, the area in which the UE is currently located.

S107: The UE receives a response message, of the tracking area update request, returned by the network device, and updates the local TAL based on the response message.

The core network device (such as the AMF) reallocates a TAL to the UE by using the response message, to update the local TAL of the UE.

It can be learned that, in this embodiment of the present invention, the TAC, the TA, and the TAL are designed, so that the broadcast TAC and each TAC in the TAL implicitly include geographical location range information of corresponding TAs, and non-uniform tracking area design is supported, to adapt to features of unbalanced satellite network service load and unequal terrestrial latitude distances. In addition, in this embodiment of the present invention, the TAC that is broadcast by the satellite cell may be dynamically changed based on a coverage area of the satellite cell, or the satellite cell dynamically adjusts, at different moments, a tracking area size for broadcasting, and no additional bit overheads are caused. The UE may determine, based on information in the TAC and TAL, whether to perform TAU. The UE performs TAU only when it is determined that the UE has moved into the corresponding TA. Otherwise, TAU is not performed. This avoids unnecessary TAU and saves radio resources.

Figure 13:
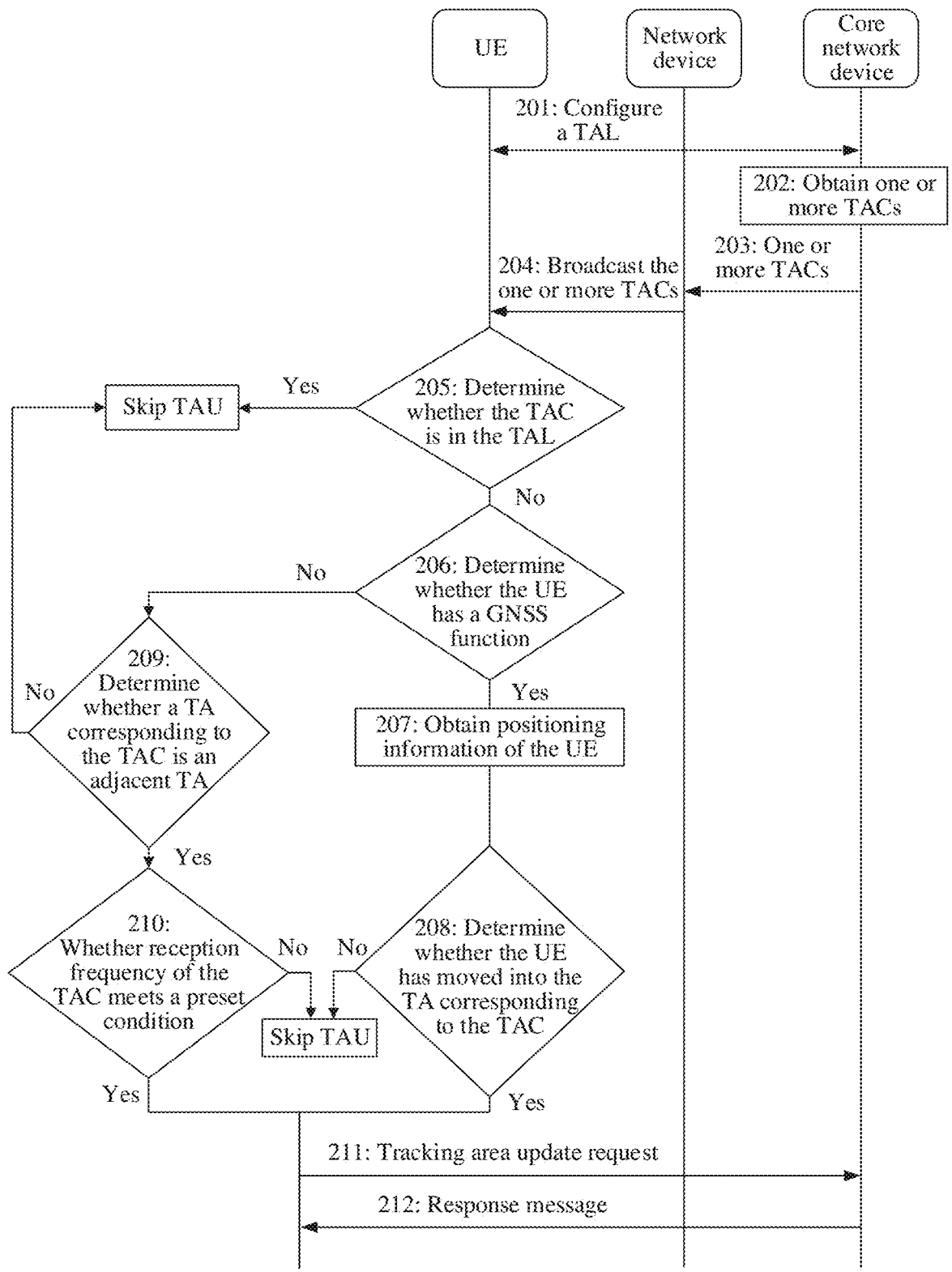
FIG. 13 is a schematic flowchart of another satellite tracking area update method according to an embodiment of the present invention.

FIG. 13 is a schematic flowchart of another satellite tracking area update method according to an embodiment of the present invention. The method includes but is not limited to the following steps.

S201: Configure a tracking area list (TAL) for UE.

For example, after registering with a network or after updating a local tracking area list of the UE, the UE may obtain the tracking area list (TAL). The TAL includes a plurality of TACs, and different TACs correspond to different TAs. A TAC design manner in this embodiment of the present invention is also described above, and details are not described herein again.

In this embodiment of the present invention, a network side performs division into TAs according to a specific rule (for example, based on a region or a service). Non-uniform or uniform TA design may be performed. A TA design manner in this embodiment of the present invention is described above, and details are not described herein again.

S202: A core network device obtains one or more tracking area codes (TAC).

The core network device may generate, in real time based on a moving track of a satellite, a TAC that needs to be broadcast by a beam of the satellite currently.

In some embodiments, if the core network device determines, in real time based on the moving track of the satellite, that the beam corresponding to a satellite cell of the satellite covers only one TA, the at least one TAC is a TAC of the one TA; or if the beam corresponding to a satellite cell of the satellite covers two or more TAs, the at least one TAC includes a TAC of each of the two or more TAs. For related implementation, refer to the foregoing descriptions of the embodiment in FIG. 11. Details are not described herein again.

In some embodiments, if the core network device determines, in real time based on the moving track of the satellite, that the beam corresponding to a satellite cell of the satellite covers only one TA, the at least one TAC is a TAC of the one TA; or if the beam corresponding to a satellite cell of the satellite covers two or more TAs, the at least one TAC is a TAC of a tracking area combination that includes the two or more TAs. For related implementation, refer to the foregoing descriptions of the embodiment in FIG. 12. Details are not described herein again.

S203: The core network device sends the one or more TACs to a network device.

In this embodiment of the present invention, the network device may be a satellite node or a base station device.

When the network device is a satellite node, the core network device (such as an AMF) sends the one or more TACs to the satellite node.

When the network device is a base station device (such as a cellular base station), the core network device (such as an AMF) sends the one or more TACs to a satellite node, and then the satellite node broadcasts the TAC to the base station device by using the satellite cell.

S204: The network device broadcasts the one or more TACs.

When the network device is a satellite node, the satellite node may broadcast the one or more TACs by using the satellite cell.

When the network device is a base station device (such as a cellular base station), the base station device may broadcast the one or more TACs by using a base station cell.

Correspondingly, on a UE side, the UE periodically listens for a TAC that is broadcast by the cell, to obtain the one or more TACs.

S205: The UE determines whether the received TAC is in the local TAL of the UE; and if a determining result is that the TAC is in the local TAL of the UE, the UE subsequently does not perform a TAU operation; or if a determining result is that the TAC is not in the local TAL of the UE, the UE continues to perform S206.

S206: If the UE has a GNSS function, the UE continues to perform S207; or if the UE does not have the GNSS function, the UE continues to perform S209.

On the UE side, different types of UEs may determine, in different manners based on TALs and newly received TACs, whether to perform TAU.

In a specific embodiment, different UEs may be classified into UE with the GNSS function and UE with no GNSS function. The UE with the GNSS function includes a GNSS apparatus, and the GNSS apparatus is configured to obtain positioning information of the UE by using a global navigation satellite system (GNSS).

The GNSS may be, for example, one of the global positioning system (GPS), the BeiDou navigation satellite system (BDS), the global navigation satellite system (GLONASS), and the Galileo satellite navigation system, or a combination of more than one of these systems.

S207: The UE obtains the current positioning information of the UE, that is, longitude and latitude of a current location of the UE, by using the GNSS function.

S208: The UE determines, based on the positioning information of the UE and the TAL, whether the UE has moved into the TA corresponding to the TAC; and if a determining result is that the UE has moved into the TA corresponding to the TAC, the UE subsequently performs S211 and S212; or if a determining result is that the UE has not moved into the TA corresponding to the TAC, the UE subsequently does not perform a TAU operation.

The UE determines an actual location of the UE based on the positioning information of the UE, and the UE also determines, based on the received TAC, a geographical range of the TA corresponding to the TAC. Then, the UE may determine whether the actual location of the UE is within the geographical range of the TA. If the actual location of the UE is within the geographical range of the TA, it indicates that the UE has moved into the TA corresponding to the TAC. Otherwise, it indicates that the UE has not moved into the TA corresponding to the TAC.

In an example, when the TA is a circular area, the UE with the GNSS function may determine whether a formula (1) is satisfied:

$$|(\text{long}\_u, \text{lat}\_u) - (\text{long}\_\text{tac}, \text{lat}\_\text{tac})| < \text{thresh} \quad (1)$$

Herein, long_u and lat_u respectively correspond to a longitude value and latitude value of the UE, long_tac and lat_tac respectively correspond to a longitude value and latitude value of a central location point of the TA corresponding to the newly received TAC, and thresh represents a distance threshold. For example, the threshold may be a radius distance value of the TA area.

If the formula (1) is satisfied, the UE may subsequently perform a TAU process. Otherwise, the UE does not perform TAU.

It should be noted that the foregoing formula (1) is merely intended to explain rather than limit the technical solutions of the present invention.

S209: The UE determines whether the TA corresponding to the TAC is an adjacent TA; and if a determining result is that the TA corresponding to the TAC is an adjacent TA, the UE performs S210; or if a determining result is that the TA corresponding to the TAC is not an adjacent TA, the UE subsequently does not perform a TAU operation.

The UE with no GNSS function may determine whether to perform TAU, by analyzing an adjacency relationship between the TA corresponding to the newly received TAC and a TA corresponding to at least one TAC in the TAL. In a specific embodiment, the adjacency relationship may indicate that the two TAs are adjacent TAs (geometrically adjacent). It should be noted that, in other embodiments, the adjacency relationship may be alternatively defined as that a center distance between the two TAs is less than a given threshold, or may be another type of adjacency relationship.

Figure 14:
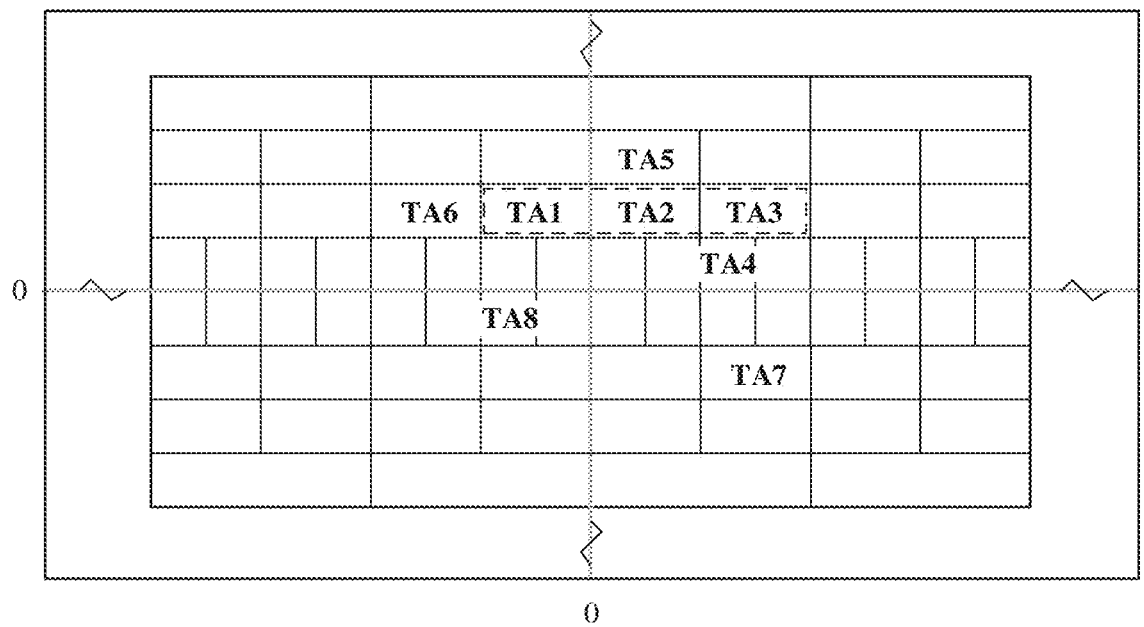
FIG. 14 is a schematic diagram of a scenario of determining an adjacency relationship between tracking areas according to an embodiment of the present invention.

For example, as shown in FIG. 14, a current TAL of the UE is {TAC1, TAC2, TAC3}, respectively corresponding to a TA1, a TA2, and a TA3.

If the newly received TAC is a TAC4 (corresponding to a TA4), a TAC5 (corresponding to a TA5), or a TAC6 (corresponding to a TA6), because the TA4 has an adjacency relationship with the TA3, the TA5 has an adjacency relationship with the TA2, and the TA6 has an adjacency relationship with the TA1, in these cases, S210 is subsequently performed.

If the newly received TAC is a TAC7 (corresponding to a TA7) or a TAC8 (corresponding to a TA8), because the TA7 does not have the adjacency relationship with any one of the TA1, the TA2, and the TA3, and the TA8 does not have the adjacency relationship with any one of the TA1, the TA2, and the TA3, in these cases, the UE subsequently does not perform a TAU operation.

S210: The UE determines whether reception frequency of the TAC meets a preset condition; and if the preset condition is met, the UE subsequently performs S211 and S212; or if the preset condition is not met, the UE subsequently does not perform a TAU operation.

In a specific embodiment, when the TA corresponding to the newly received TAC is an adjacent TA, the UE may determine whether the reception frequency of the TAC is greater than a preset threshold or whether the reception frequency of the TAC meets another preset condition. If the reception frequency of the TAC is greater than the preset threshold or meets another preset condition, it may be considered that the UE has moved into the TA corresponding to the TAC, and in this case, S211 and S212 are subsequently performed. Otherwise, it may be considered that the UE has not moved into the TA corresponding to the TAC, and in this case, the TAU operation is not subsequently performed.

S211: The UE sends a tracking area update request to the core network device.

In a specific embodiment, the UE may send the tracking area update request to the core network device (such as the AMF), to notify the core network device that the UE has moved out of a current TA area, and re-register, with a core network, the area in which the UE is currently located.

S212: The UE receives a response message, of the tracking area update request, returned by the core network device, and updates the local TAL based on the response message.

The core network device reallocates a TAL to the UE by using the response message, to update the local TAL of the UE.

It can be learned that, in this embodiment of the present invention, the TAC, the TA, and the TAL are designed, so that the broadcast TAC and each TAC in the TAL implicitly include geographical location range information of corresponding TAs, and non-uniform tracking area design is supported, to adapt to features of unbalanced satellite network service load and unequal terrestrial latitude distances. The UE may determine, based on information in the TAC and TAL, whether to perform TAU. Moreover, in this embodiment of the present invention, location management requirements of different types of users (that is, with/without GNSS assistance) can be distinguished from each other, to provide differentiated TAU services for users with the GNSS function and users with no GNSS function.

If the newly received TAC does not belong to the TAL, the UE with the GNSS function may determine, by analyzing the positioning information of the UE and the TAC, whether the UE has moved into the corresponding TA. The UE performs TAU only when it is determined that the UE has moved into the corresponding TA. Otherwise, TAU is not performed. This avoids unnecessary TAU and saves radio resources.

The UE with no GNSS function analyzes whether the TA corresponding to the newly received TAC is an adjacent TA, and needs to further determine, if it is determined that the TA is an adjacent TA, whether the reception frequency of the TAC meets the preset condition. The UE determines to perform TAU, only when the condition is met. Otherwise, TAU is not performed. This greatly reduces unnecessary TAU and saves radio resources.

The foregoing describes in detail the method in the embodiments of the present invention. The following provides a related apparatus in the embodiments of the present invention.

Figure 15:
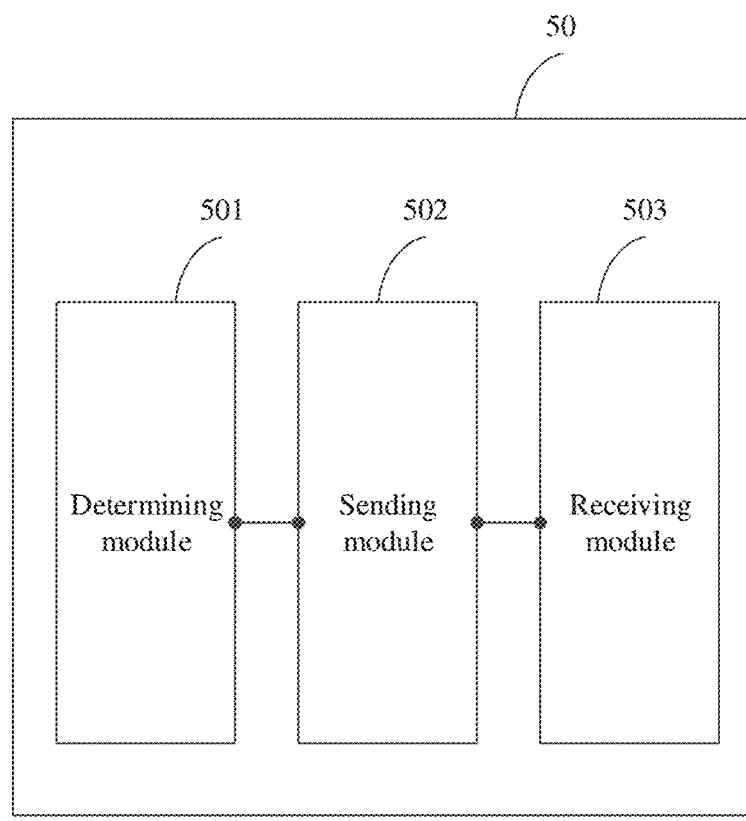
FIG. 15 is a schematic structural diagram of user equipment according to an embodiment of the present invention.

FIG. 15 is a structural block diagram of user equipment 50 according to an embodiment of the present invention. The user equipment 50 may include a determining module 501, a sending module 502, and a receiving module 503. In a specific implementation, data/programs of these function modules may be stored in the following memory 801, the determining module 501 may be run on the following processor 802, and function implementation of the sending module 502 and the receiving module 503 depends on signal transmission and reception by the following transceiver 803 on an uplink channel/a downlink channel.

The receiving module 503 is configured to receive at least one tracking area code (TAC) that is broadcast by a network device, where the TAC includes geographical location information, and the geographical location information is used to indicate a geographical location of a preset location point in a tracking area (TA) corresponding to the TAC.

The determining module 501 is configured to determine, based on the TAC and a tracking area list (TAL), whether the TAL needs to be updated.

The sending module 502 is configured to: if it is determined that the TAL needs to be updated, send a tracking area update request to the network device. The receiving module 503 is further configured to receive a response message, of the tracking area update request, returned by the network device.

In some feasible embodiments, the TAC further includes span indication information, and the span indication information is used to indicate a longitude-direction and/or latitude-direction span of the TA corresponding to the TAC.

In some feasible embodiments, the determining module 501 is configured to: query the TAL, to determine whether the TAC is recorded in the TAL; determine, if the TAC is not recorded in the TAL, whether the user equipment has moved into the TA corresponding to the TAC; and if it is determined that the user equipment has moved into the TA corresponding to the TAC, determine that the TAL needs to be updated; or if it is determined that the user equipment has not moved into the TA corresponding to the TAC, determine that the TAL does not need to be updated.

In some feasible embodiments, the user equipment further includes a GNSS module, and the GNSS module is configured to obtain positioning information of the user equipment by using a global navigation satellite system (GNSS). The determining module 501 is configured to determine, based on the positioning information of the user equipment and the span indication information and geographical location information in the TAC, whether the user equipment has moved into the TA corresponding to the TAC.

In some feasible embodiments, the user equipment includes no GNSS module, and the determining module 501 is configured to: determine, based on the span indication information and geographical location information in the TAC and the TAL, whether the TA corresponding to the TAC has an adjacency relationship with a TA corresponding to any TAC recorded in the TAL, where a plurality of different TACs are recorded in the TAL, and each TAC includes respective span indication information and geographical location information; and if the TA corresponding to the TAC has no adjacency relationship with the TA corresponding to any TAC recorded in the TAL, determine that the user equipment has not moved into the TA corresponding to the TAC.

In some feasible embodiments, the determining module 501 is further configured to: if the TA corresponding to the TAC has the adjacency relationship with the TA corresponding to any TAC recorded in the TAL, determine, based on reception frequency of the TAC, whether the user equipment has moved into the TA corresponding to the TAC.

In some feasible embodiments, the TA corresponding to the TAC includes N grid units, N is a positive integer greater than or equal to 1, and the span indication information is used to indicate a longitude-direction grid unit quantity and/or latitude-direction grid unit quantity of the tracking area TA corresponding to the TAC.

In some feasible embodiments, if a beam of a satellite cell covers only one TA, the at least one TAC is a TAC of the one TA; or if a beam of a satellite cell covers two or more TAs, the at least one TAC includes a TAC of each of the two or more TAs.

In some feasible embodiments, if a beam of a satellite cell covers only one TA, the at least one TAC is a TAC of the one TA; or if a beam of a satellite cell covers two or more TAs, the at least one TAC is a TAC of a tracking area combination that includes the two or more TAs.

In some feasible embodiments, the span indication information occupies a data length of X bits, the geographical location information occupies a data length of Y bits, and a sum of X and Y is equal to 16.

It should be noted that, in a specific embodiment of the present invention, the user equipment 50 may be the UE in the embodiments in FIG. 10 and FIG. 13. That is, during specific implementation, for function implementation of each module of the user equipment 50, reference may be made to related method step descriptions in the foregoing embodiments. For brevity of the specification, details are not described herein again.

Figure 16:
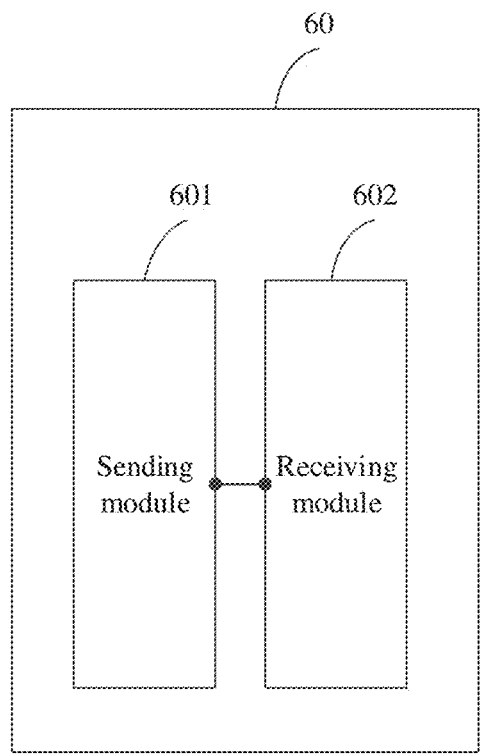
FIG. 16 is a schematic structural diagram of a network device according to an embodiment of the present invention.

FIG. 16 is a structural block diagram of a network device 60 according to an embodiment of the present invention. The network device 60 may include a sending module 601 and a receiving module 602, and may further include a determining module. In a specific implementation, data/programs of these function modules may be stored in the following memory 901, the determining module may be run on the following processor 902, and function implementation of the sending module 601 and the receiving module 602 depends on signal transmission and reception by the following transceiver 903 on an uplink channel/a downlink channel.

The sending module 601 is configured to broadcast at least one tracking area code (TAC) to user equipment, where the TAC includes geographical location information, and the geographical location information is used to indicate a geographical location of a preset location point in a tracking area (TA) corresponding to the TAC.

The receiving module 602 is configured to receive a tracking area update request from the user equipment, where the tracking area update request is determined by the user equipment based on the TAC and a tracking area list (TAL) of the user equipment.

The sending module 601 is further configured to return a response message of the tracking area update request to the user equipment.

In some feasible embodiments, the TAC further includes span indication information, and the span indication information is used to indicate a longitude-direction and/or latitude-direction span of the TA corresponding to the TAC.

In some feasible embodiments, the TA corresponding to the TAC includes N grid units, N is a positive integer greater than or equal to 1, and the span indication information is used to indicate a longitude-direction grid unit quantity and/or latitude-direction grid unit quantity of the tracking area TA corresponding to the TAC.

In some feasible embodiments, a plurality of different TACs are recorded in the TAL, and each TAC includes respective span indication information and geographical location information.

In some feasible embodiments, the network device further includes a determining module. The determining module is configured to: determine a coverage area of a beam of a satellite cell; and if the beam of the satellite cell covers only one TA, determine that the at least one TAC is a TAC of the one TA; or if the beam of the satellite cell covers two or more TAs, determine that the at least one TAC includes a TAC of each of the two or more TAs.

In some feasible embodiments, the network device 60 further includes a determining module. The determining module is configured to: determine a coverage area of a beam of a satellite cell; and if the beam of the satellite cell covers only one TA, determine that the at least one TAC is a TAC of the one TA; or if the beam of the satellite cell covers two or more TAs, determine that the at least one TAC is a TAC of a tracking area combination that includes the two or more TAs.

In some feasible embodiments, the span indication information occupies a data length of X bits, the geographical location information occupies a data length of Y bits, and a sum of X and Y is equal to 16.

It should be noted that, in a specific embodiment of the present invention, the network device 60 may be the network device in the embodiments in FIG. 10 and FIG. 13. That is, during specific implementation, for function implementation of each module of the network device 60, reference may be made to related method step descriptions in the foregoing embodiments. For brevity of the specification, details are not described herein again.

Figure 17:
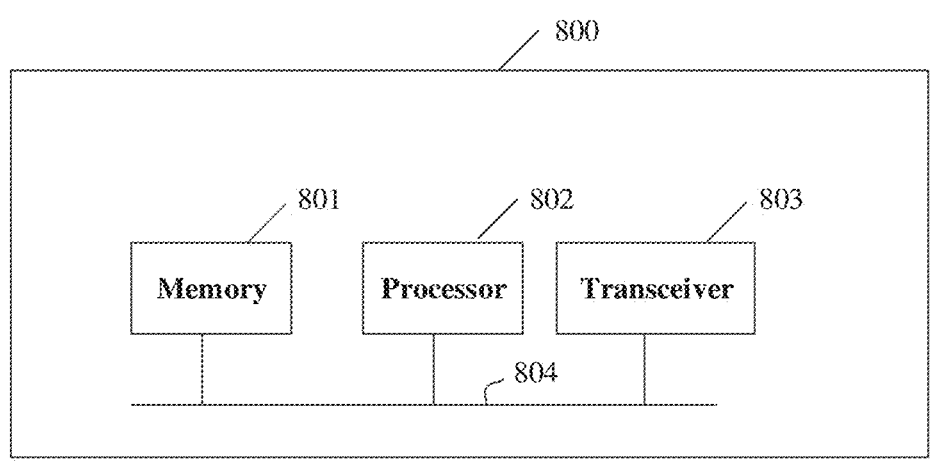
FIG. 17 is a schematic structural diagram of user equipment according to an embodiment of the present invention.

FIG. 17 shows another apparatus 800 according to an embodiment of the present invention. The apparatus 800 is, for example, the user equipment described in the embodiments of the present invention. The apparatus 800 includes a processor 802, a memory 801, and a transceiver 803. Two or all of the processor 802, the memory 801, and the transceiver 803 may be connected to each other by using a bus 804, or may be integrated with each other.

The memory 801 includes but is not limited to a random access memory (RAM), a read-only memory (ROM), an erasable programmable read only memory (EPROM), or a compact disc read-only memory (CD-ROM). The memory 801 is used for related instructions and data.

The transceiver 803 is configured to receive data (such as a TAC, a TAL, and a response message) sent by a network device, or send data (for example, send a TAU request) to a network device.

The processor 802 may be one or more central processing units (CPU). If the processor 802 is one CPU, the CPU may be a single-core CPU, or may be a multi-core CPU. The processor 802 in the apparatus 800 may be configured to perform the related method on the user equipment side in the embodiments in FIG. 10 and FIG. 13.

Figure 18:
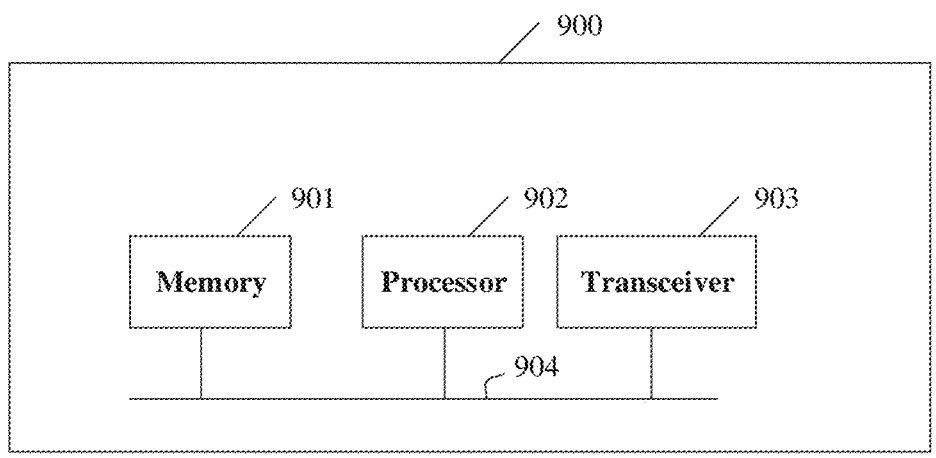
FIG. 18 is a schematic structural diagram of a network device according to an embodiment of the present invention.

FIG. 18 shows another apparatus 900 according to an embodiment of the present invention. The apparatus 900 is, for example, the network device described in the embodiments of the present invention. The apparatus 900 includes a processor 902, a memory 901, and a transceiver 903. Two or all of the processor 902, the memory 901, and the transceiver 903 may be connected to each other by using a bus 904, or may be integrated with each other.

The memory 901 includes but is not limited to a random access memory (RAM), a read-only memory (ROM), an erasable programmable read only memory (EPROM), or a compact disc read-only memory (CD-ROM). The memory 901 is used for related instructions and data.

The transceiver 903 is configured to receive data (such as a TAU request) sent by user equipment, or send data (such as a TAC, a TAL, and a response message) to user equipment.

The processor 902 may be one or more central processing units (CPU). If the processor 902 is one CPU, the CPU may be a single-core CPU, or may be a multi-core CPU.

The processor 900 in the apparatus 902 may be configured to perform the related method on a network device side in the embodiments in FIG. 10 and FIG. 13.

Based on a same invention idea, an embodiment of the present invention provides another apparatus. During specific implementation, the apparatus may be a chip. The apparatus includes a processor and a memory coupled to or integrated with the processor.

The memory is configured to store computer program instructions.

The processor is configured to execute a computer program stored in the memory, to receive at least one tracking area code (TAC) that is broadcast by a network device, where the TAC includes geographical location information, and the geographical location information is used to indicate a geographical location of a preset location point in a tracking area (TA) corresponding to the TAC; determine, based on the TAC and a tracking area list (TAL), whether the TAL needs to be updated; if it is determined that the TAL needs to be updated, send a tracking area update request to the network device; and receive a response message, of the tracking area update request, returned by the network device.

In a possible embodiment, the chip may be coupled to a transceiver. The transceiver may be configured to send data to a base station or receive data from a base station. For example, the transceiver is configured to receive the at least one tracking area code (TAC) that is broadcast by the network device. For another example, the transceiver is configured to send the tracking area update request to the network device if it is determined that the TAL needs to be updated. For another example, the transceiver is configured to receive the response message, of the tracking area update request, returned by the network device.

In a possible embodiment, the chip may be applied to user equipment. For specific function implementation of the chip, further refer to related function descriptions of the user equipment in the embodiments in FIG. 10 and FIG. 13. Details are not described herein again.

Based on a same invention idea, an embodiment of the present invention provides another apparatus. During specific implementation, the apparatus may be a chip. The apparatus includes a processor and a memory coupled to or integrated with the processor.

The memory is configured to store computer program instructions.

The processor is configured to execute a computer program stored in the memory, to broadcast at least one tracking area code (TAC) to user equipment, where the TAC includes geographical location information, and the geographical location information is used to indicate a geographical location of a preset location point in a tracking area (TA) corresponding to the TAC; receive a tracking area update request from the user equipment, where the tracking area update request is determined by the user equipment based on the TAC and a tracking area list (TAL) of the user equipment; and return a response message of the tracking area update request to the user equipment.

In a possible embodiment, the chip may be coupled to a transceiver. The transceiver may be configured to send data to a terminal or receive data from a terminal, for example, broadcast the at least one tracking area code (TAC) to the user equipment, for example, receive the tracking area update request from the user equipment, and for example, return the response message of the tracking area update request to the user equipment.

In a possible embodiment, the chip may be applied to a network device. For specific function implementation of the chip, further refer to related function descriptions of the network device in the embodiments in FIG. 10 and FIG. 13. Details are not described herein again.

All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instruction is loaded and executed on a computer, all or some of the procedures or functions according to the embodiments of the present invention are generated. The computer may be a general-purpose computer, a special-purpose computer, a computer network, or another programmable apparatus. The computer instruction may be stored in a computer-readable storage medium or may be transmitted from a computer-readable storage medium to another computer-readable storage medium. For example, the computer instruction may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

In the foregoing embodiments, descriptions of the embodiments have respective focuses. For a part that is not described in detail in an embodiment, refer to related descriptions in another embodiment.

What is claimed is:

1. A method, comprising:
receiving, by user equipment, at least one tracking area code (TAC) that is broadcast by a network device, wherein the TAC comprises geographical location information, and the geographical location information indicates a geographical location of a preset location point in a tracking area (TA) corresponding to the TAC;
determining, by the user equipment based on the TAC and a tracking area list (TAL), whether the TAL needs to be updated by:
querying, by the user equipment, the TAL, to determine whether the TAC is recorded in the TAL,
determining, by the user equipment in response to determining that the TAC is not recorded in the TAL, whether the user equipment has moved into the TA corresponding to the TAC, and
performing the following:
in response to determining that the user equipment has moved into the TA corresponding to the TAC, determining, by the user equipment, that the TAL needs to be updated, or
in response to determining that the user equipment has not moved into the TA corresponding to the TAC, determining, by the user equipment, that the TAL does not need to be updated; and
in response to determining that the TAL needs to be updated, sending, by the user equipment, a tracking area update request to the network device; and
receiving, by the user equipment, a response message of the tracking area update request that is returned by the network device.

2. The method according to claim 1, wherein the TAC further comprises span indication information, and the span indication information indicate at least one of a longitude-direction span or a latitude-direction span of the TA corresponding to the TAC.

3. The method according to claim 2, wherein the user equipment comprises a GNSS apparatus, and the GNSS apparatus is configured to obtain positioning information of the user equipment by using a global navigation satellite system (GNSS); and
wherein determining, by the user equipment in response to determining that the TAC is not recorded in the TAL, whether the user equipment has moved into the TA corresponding to the TAC comprises:
determining, by the user equipment based on the positioning information of the user equipment and the span indication information and geographical location information in the TAC, whether the user equipment has moved into the TA corresponding to the TAC.

4. The method according to claim 2, wherein determining, by the user equipment in response to determining that the TAC is not recorded in the TAL, whether the user equipment has moved into the TA corresponding to the TAC comprises:
determining, by the user equipment based on the span indication information and geographical location information in the TAC and the TAL, whether the TA corresponding to the TAC has an adjacency relationship with a TA corresponding to any TAC recorded in the TAL, wherein a plurality of different TACs are recorded in the TAL, and each TAC recorded in the TAL comprises respective span indication information and respective geographical location information; and
in response to determining that the TA corresponding to the TAC has no adjacency relationship with the TA corresponding to any TAC recorded in the TAL, determining, by the user equipment, that the user equipment has not moved into the TA corresponding to the TAC.

5. The method according to claim 4, wherein the method comprises:
in response to determining that the TA corresponding to the TAC has an adjacency relationship with the TA corresponding to at least one TAC recorded in the TAL, determining, by the user equipment based on a reception frequency of the TAC, whether the user equipment has moved into the TA corresponding to the TAC.

6. The method according to claim 2, wherein the TA corresponding to the TAC comprises N grid units, N is a positive integer greater than or equal to 1, and the span indication information indicates at least one of a longitude-direction grid unit quantity or latitude-direction grid unit quantity of the TA corresponding to the TAC.

7. The method according to claim 2, wherein the span indication information occupies X bits, the geographical location information occupies Y bits, and a sum of X and Y is equal to 16.

8. The method according to claim 1, wherein:
a beam of a satellite cell covers only one TA, and the at least one TAC is of the one TA; or
a beam of a satellite cell covers two or more TAs, and the at least one TAC comprises a TAC of each of the two or more TAs.

9. The method according to claim 1, wherein:
a beam of a satellite cell covers only one TA, and the at least one TAC is a TAC of the one TA; or
a beam of a satellite cell covers two or more TAs, and the at least one TAC is a TAC of a tracking area combination that comprises the two or more TAs.

10. A method, comprising:
broadcasting, by a network device, at least one tracking area code (TAC) to user equipment, wherein the TAC comprises geographical location information, and the geographical location information indicates a geographical location of a preset location point in a tracking area (TA) corresponding to the TAC;
receiving, by the network device, a tracking area update request from the user equipment, wherein the tracking area update request is determined by the user equipment based on the TAC and a tracking area list (TAL) of the user equipment in response to the TAC not being recorded in the TAL and the user equipment having moved into the TA corresponding to the TAC; and
returning, by the network device, a response message of the tracking area update request to the user equipment.

11. An apparatus, comprising:
at least one processor, wherein the at least one processor is coupled to a non-transitory memory storing a computer program that is executable by the at least one processor, and the at least one processor, when executing the computer program, is configured to:

receive at least one tracking area code (TAC) that is broadcast by a network device, wherein the TAC comprises geographical location information, and the geographical location information indicates a geographical location of a preset location point in a tracking area (TA) corresponding to the TAC;

determine, based on the TAC and a tracking area list (TAL), whether the TAL needs to be updated;

query the TAL, to determine whether the TAC is recorded in the TAL;

determine, in response to determining that the TAC is not recorded in the TAL, whether the apparatus has moved into the TA corresponding to the TAC, and determine as follows:

in response to determining that the apparatus has moved into the TA corresponding to the TAC, determine that the TAL needs to be updated, or in response to determining that the apparatus has not moved into the TA corresponding to the TAC, determine that the TAL does not need to be updated;

in response to determining that the TAL needs to be updated, send a tracking area update request to the network device; and receive a response message, of the tracking area update request, returned by the network device.

12. The apparatus according to claim 11, wherein the TAC further comprises span indication information, and the span indication information indicates at least one of a longitude-direction span or latitude-direction span of the TA corresponding to the TAC.

13. The apparatus according to claim 12, wherein the at least one processor is configured to obtain positioning information of the apparatus using a global navigation satellite system (GNSS); and the at least one processor, when executing the computer program, is configured to:

determine, based on the positioning information of the apparatus and the span indication information and geographical location information in the TAC, whether the apparatus has moved into the TA corresponding to the TAC.

14. The apparatus according to claim 12, wherein the at least one processor, when executing the computer program, is configured to:

determine, based on the span indication information and geographical location information in the TAC and the TAL, whether the TA corresponding to the TAC has an adjacency relationship with a TA corresponding to any TAC recorded in the TAL, wherein a plurality of different TACs are recorded in the TAL, and each TAC recorded in the TAL comprises respective span indication information and respective geographical location information; and in response to determining that the TA corresponding to the TAC has no adjacency relationship with the TA corresponding to any TAC recorded in the TAL, determine that the apparatus has not moved into the TA corresponding to the TAC.

15. The apparatus according to claim 14, wherein the at least one processor, when executing the computer program, is configured to:

in response to determining that the TA corresponding to the TAC has an adjacency relationship with the TA corresponding to at least one TAC recorded in the TAL, determine, based on reception frequency of the TAC, whether the apparatus has moved into the TA corresponding to the TAC.

16. The apparatus according to claim 12, wherein the TA corresponding to the TAC comprises N grid units, N is a positive integer greater than or equal to 1, and the span indication information indicates at least one of a longitude-direction grid unit quantity or latitude-direction grid unit quantity, of the TA corresponding to the TAC.

17. The apparatus according to claim 11, wherein:

a beam of a satellite cell covers only one TA, and the at least one TAC is of the one TA; or a beam of a satellite cell covers two or more TAs, and the at least one TAC comprises a TAC of each of the two or more TAs.

18. The apparatus according to claim 11, wherein:

a beam of a satellite cell covers only one TA, and the at least one TAC is of the one TA; or a beam of a satellite cell covers two or more TAs, and the at least one TAC is a TAC of a tracking area combination that comprises the two or more TAs.

19. The method according to claim 10, wherein the TAC further comprises span indication information, and the span indication information indicate at least one of a longitude-direction span or a latitude-direction span of the TA corresponding to the TAC.

20. The method according to claim 10, wherein:

a beam of a satellite cell covers only one TA, and the at least one TAC is of the one TA; or a beam of a satellite cell covers two or more TAs, and the at least one TAC comprises a TAC of each of the two or more TAs.

* * * * *